US012143799B2

(12) United States Patent
Nishiguchi et al.

(10) Patent No.: US 12,143,799 B2
(45) Date of Patent: Nov. 12, 2024

(54) ACOUSTIC SIGNAL ENCODING METHOD, ACOUSTIC SIGNAL DECODING METHOD, PROGRAM, ENCODING DEVICE, ACOUSTIC SYSTEM, AND DECODING DEVICE

(71) Applicant: AKITA PREFECTURAL UNIVERSITY, Akita (JP)

(72) Inventors: Masayuki Nishiguchi, Akita (JP); Kodai Kato, Ibaraki (JP)

(73) Assignee: AKITA PREFECTURAL UNIVERSITY, Akita (JP)

( * ) Notice: Subject to any disclaimer, the term of this patent is extended or adjusted under 35 U.S.C. 154(b) by 304 days.

(21) Appl. No.: 17/432,098

(22) PCT Filed: Feb. 18, 2020

(86) PCT No.: PCT/JP2020/006211
§ 371 (c)(1),
(2) Date: Aug. 19, 2021

(87) PCT Pub. No.: WO2020/171049
PCT Pub. Date: Aug. 27, 2020

(65) Prior Publication Data

US 2023/0136085 A1 May 4, 2023

(30) Foreign Application Priority Data

Feb. 19, 2019 (JP) ................................ 2019-027035

(51) Int. Cl.
*H04S 7/00* (2006.01)
*H04R 5/02* (2006.01)

(52) U.S. Cl.
CPC .............. *H04S 7/301* (2013.01); *H04R 5/02* (2013.01); *H04S 2420/01* (2013.01)

(58) Field of Classification Search
CPC .......... H04S 7/301; H04S 7/302; H04S 7/303; H04S 2420/01; H04S 2400/11; H04R 5/02
See application file for complete search history.

(56) References Cited

U.S. PATENT DOCUMENTS 5,475,789 A 12/1995 Nishiguchi
10,075,802 B1 * 9/2018 Kim ..................... G10L 19/008
(Continued)

FOREIGN PATENT DOCUMENTS

JP H05-248972 A 9/1993
JP 2014-016625 A 1/2014
(Continued)

OTHER PUBLICATIONS

Adrien Daniel et al "Multichannel audio coding based on minimum audible angles", Proceedings of 40th International Conference: Spatial Audio: Sense the Sound of Space, Jan. 1, 2010(Jan. 1, 2010), pp. 1-10, XP055009518, * Sections 1, 4 and 13 *.
(Continued)

*Primary Examiner* — Jason R Kurr
(74) *Attorney, Agent, or Firm* — Hawaii Patent Services; Nathaniel K. Fedde; Kenton N. Fedde

(57) ABSTRACT

Provided is an acoustic signal encoding method capable of encoding an acoustic signal having a large number of channels at a sufficient bit rate. In this acoustic signal encoding method, the acoustic signal of a plurality of channels are encoded by executing encoding device. Firstly, the masking threshold corresponding to the spatial masking effect of hearing is calculated. Then, the amount of information for allocating the acoustic signal of the plurality of channels to each channel is determined by the calculated masking threshold. Then, the acoustic signal of the plurality of channels are encoded with the amount of information allocated to each. This makes it possible to encode the
(Continued)

acoustic signal of the plurality of channels at a sufficient bit rate.

25 Claims, 14 Drawing Sheets

(56) References Cited

U.S. PATENT DOCUMENTS

| | | | | |
|---|---|---|---|---|
| 2010/0286990 | A1 | 11/2010 | Biswas et al. | |
| 2012/0155653 | A1 | 6/2012 | Jax et al. | |
| 2014/0355768 | A1* | 12/2014 | Sen | G10L 19/008 381/23 |
| 2014/0358557 | A1* | 12/2014 | Sen | G10L 19/02 704/500 |
| 2015/0194158 | A1 | 7/2015 | Oh et al. | |
| 2016/0072467 | A1 | 3/2016 | Seefeldt | |
| 2016/0088388 | A1* | 3/2016 | Franck | H04R 5/02 381/305 |
| 2020/0021934 | A1* | 1/2020 | Scuda | H04R 5/04 |

FOREIGN PATENT DOCUMENTS

| | | | |
|---|---|---|---|
| JP | 2015-531078 | A | 10/2015 |
| JP | 2016-518788 | A | 6/2016 |
| JP | 2016-524726 | A | 8/2016 |
| JP | 2016-224472 | A | 12/2016 |
| WO | 2009067741 | A | 6/2009 |

OTHER PUBLICATIONS

Mar. 7, 2019, vol. 118, No. 497, pp. 271-278, ISSN 2432-6380, in particular, chapter 3-4, (Kato, Kodai et al., "Study on 3D audio coding based on spatial auditory masking", IEICE technical report).

Andreas Spanias et al., "Audio Scientific Processing and Coding", USA, Wiley-Interscience, John Wiley & Sons, Inc., 2007.

* cited by examiner

WHEN MASKER HAS ONE SOUND SOURCE

WHEN MASKER HAS TWO SOUND SOURCES

ACOUSTIC SIGNAL ENCODING METHOD, ACOUSTIC SIGNAL DECODING METHOD, PROGRAM, ENCODING DEVICE, ACOUSTIC SYSTEM, AND DECODING DEVICE

TECHNICAL FIELD

The present invention particularly relates to an acoustic signal encoding method, an acoustic signal decoding method, a program, a encoding device, an acoustic system, and a decoding device.

BACKGROUND ART

Typically, in the encoding of an acoustic signal (audio signal), there is an acoustic encoding technique by bit allocation (bit allocation) in which the number of bits in the quantization of the acoustic signal input to a plurality of channels for each channel is adaptively allocated on the time axis or the frequency axis.

In recent years, in the encoding of acoustic signals such as MPEG-2 AAC, MPEG-4 AAC, and MP3, which are used as standard, the auditory masking effect on the frequency axis is utilized in the bit allocation.

The masking effect in hearing is an effect that makes it difficult to hear a certain sound due to the presence of another sound.

Patent Document 1 describes an example of an acoustic signal encoding technique utilizing an auditory masking effect. In the technique of Patent Document 1, in order to utilize the masking effect of the hearing, a threshold value for bit allocation of the masking effect (hereinafter referred to as a masking threshold) is calculated.

CITATION LIST

Patent Literature

Patent Literature 1: JPH05-248972A

Non-Patent Literature

Non-Patent Literature 1: Andreas Spanias et al., "Audio Signal Processing and Coding", USA, Wiley-Interscience, John Wiley & Sons, Inc., 2007

SUMMARY OF INVENTION

Technical Problem

However, since the typical calculation of the masking threshold does not consider a spatial relationship between a plurality of channels, there is a problem that the bit rate (band) may be insufficient for an acoustic signal having a large number of channels.

The present invention has been made in view of such a situation, and an object of the present invention is to solve the above-mentioned problem.

Solution to Problem

An acoustic signal encoding method according to the present invention is an acoustic signal encoding method that encodes an acoustic signal of a plurality of channels and that is executed by an encoding device, including the steps of: calculating a masking threshold corresponding to spatial masking effect of hearing; determining amount of information to be allocated to each of the plurality of channels by calculated masking threshold; and encoding the acoustic signal of the plurality of channels by each of allocated amount of information.

A program according to the present invention is a program executed by a encoding device that encodes an acoustic signal of a plurality of channels, and the encoding device executes the steps of: calculating a masking threshold corresponding to spatial masking effect of hearing; determining amount of information to be allocated to each of the plurality of channels by the calculated masking threshold; and encoding the acoustic signal of the plurality of channels by each of allocated amount of information.

An encoding device according to the present invention is an encoding device that encodes an acoustic signal of a plurality of channels and/or a sound source object and position information of the sound source object, including: a masking threshold calculation unit that calculates a masking threshold corresponding to spatial masking effect of hearing; an information amount determination unit that determines the amount of information to be allocated to each channel and/or the sound source object based on the masking threshold calculated by the masking threshold calculation unit; and an encoding unit that encodes the acoustic signal of the plurality of the channels and/or the sound source object and the position information of the sound source object by each of allocated amount of information.

An acoustic system according to the present invention is an acoustic system including the encoding device and a decoding device, wherein the decoding device includes: a direction calculation unit that calculates the direction to which a listener is facing, a transmission unit that transmits the direction calculated by the direction calculation unit to the encoding device, and a decoding unit that decodes the acoustic signal of the plurality of the channel and/or the sound source object encoded by the encoding device into an audio signal; and the masking threshold calculation unit of the encoding device calculates the masking threshold corresponding to the spatial masking effect based on spatial distance and/or direction between each of the channels and/or between each of the sound source objects according to position and direction of the listener.

A decoding device according to the present invention includes a signal acquisition unit that acquires a signal that amount of information to allocate to each channel and/or sound source object is determined by a masking threshold that corresponds to a spatial masking effect of hearing, and an acoustic signal of the plurality of channels and/or the sound source object and position information of the sound source object are encoded by each of allocated amount of information; and a decoding unit that decodes an encoded acoustic signal of the plurality of channels and/or the sound source object into an audio signal from the signal acquired by the signal acquisition unit.

Advantageous Effects of Invention

According to the present invention, a masking threshold corresponding to spatial masking effect of hearing is calculated, and the amount of information to be allocated to each of a plurality of the channels is determined by the calculated masking threshold, and encoding with the allocated amount of information is performed; and thus, it is possible to provide an acoustic signal coding method capable of encoding an acoustic signal having a large number of channels at a sufficient bit rate.

DESCRIPTION OF EMBODIMENTS

Embodiment

Control Configuration of Acoustic System X

Figure 1:
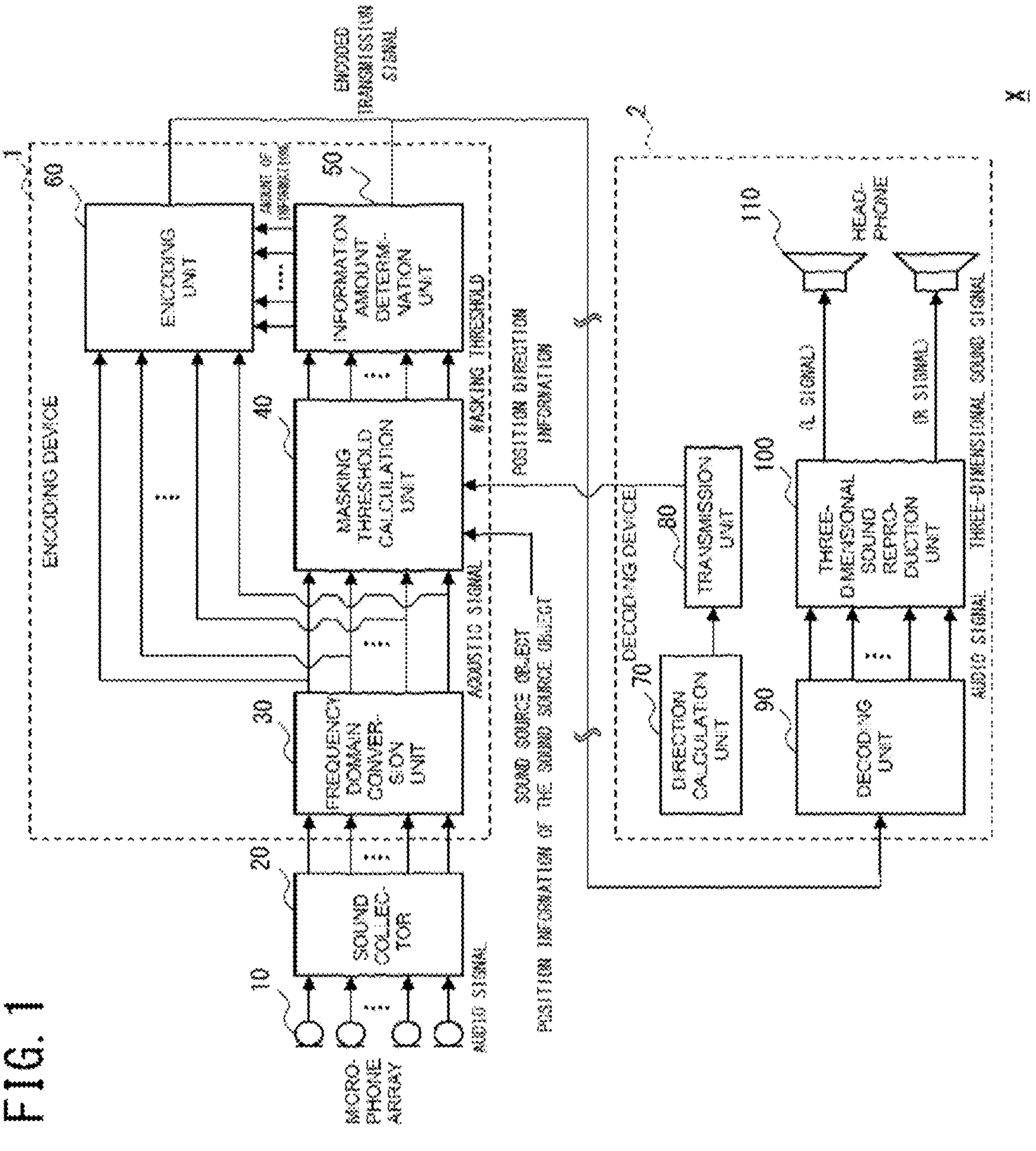
FIG. 1 is a system configuration diagram of an acoustic system according to an embodiment of the present invention.

Firstly, with reference to FIG. 1, a control configuration of an acoustic system X according to an embodiment of the present invention is described.

The acoustic system X is a system capable of acquiring an acoustic signal of a plurality of channels, encoding and transmitting them by the encoding device 1, and decoding and reproducing them by the decoding device 2.

The encoding device 1 is a device that encodes an acoustic signal. In the present embodiment, the encoding device 1 is, for example, a PC (Personal Computer), a server, an encoder board mounted on these, a dedicated encoder, or the like. The encoding device 1 according to the present embodiment encodes the acoustic signal of a plurality of channels and/or a sound source object and position information of the sound source object. For example, the encoding device 1 supports acoustic encoding methods such as MPEG-2 AAC, MPEG-4 AAC, MP3, Dolby (registered trademark) Digital, DTS (registered trademark), or the like, and it performs encoding an acoustic signal of a plurality of channels such as 2 channels, 5.1 channels, 7.1 channels, 22.2 channels, or the like.

The decoding device 2 is a device that decodes the encoded acoustic signal as the decoding device 2. In the present embodiment, the decoding device 2 is, for example, an HMD (Head-Mounted Display) for VR (Virtual Reality) or AR (Augmented Reality), a smartphone (Smart Phone), a dedicated game device, a home television, and a radio-connected headphones, a virtual multi-channel headphone, equipment for a movie theater and public viewing venue, dedicated decoders and head tracking sensors, or the like. The decoding device 2 decodes and reproduces an acoustic signal encoded by the encoding device 1 and transmitted by wire or wirelessly.

The acoustic system X is primarily configured by including: a microphone array 10, a sound collector 20, a frequency domain conversion unit 30, a masking threshold calculating unit 40, an information amount determining unit 50, an encoding unit 60, a direction calculation unit 70, a transmission unit 80, a decoding unit 90, a three-dimensional sound reproduction unit 100, and a headphone 110.

Among these, the frequency domain conversion unit 30, the masking threshold calculation unit 40, the information amount determination unit 50, and the encoding unit 60 function as the encoding device 1 according to the present embodiment (transmission side).

The direction calculation unit 70, the transmission unit 80, the decoding unit 90, the three-dimensional sound reproduction unit 100, and the headphone 110 function as the decoding device 2 according to the present embodiment (reception side).

The microphone array 10 collects sound in a sound space that is a space where various sounds exist in various places. Specifically, for example, the microphone array 10 acquires sound waves in a plurality of directions for 360 degree. At this time, by controlling the directivity by beamforming processing and directing the beam in each direction, it is possible to perform spatial sampling of the sound space and acquire a multi-channel audio beam signal. Specifically, in the beamforming of the present embodiment, phase difference of the sound waves arriving at each microphone of the microphone array 10 is controlled by a filter, and the signal in the direction arriving at each microphone is emphasized. Moreover, as spatial sampling, sound field is spatially divided and the sound is collected in multiple channels while including the spatial information.

The sound collecting unit 20 is a device such as a mixer, or the like, which collects the sounds of the plurality of channels and transmits them as the acoustic signal to the encoding device 1.

The frequency domain conversion unit 30 cuts out the sound beam signal for each direction obtained by spatial sampling into a window (frame) about several microseconds to several tens of milliseconds, and it converts from time domain to frequency domain by DFT (discrete Fourier transform), MDCT (Modified Discrete Cosine Transform), or the like. As for the frame, for example, it is preferable to use about 2048 samples with a sampling frequency of 48 kHz and a quantization bit rate of 16 bits. The frequency domain conversion unit 30 outputs the frame as the acoustic signal of each channel. That is, the acoustic signal according to the present embodiment is a signal in the frequency domain.

The masking threshold calculation unit 40 calculates a masking threshold corresponding to the spatial masking effect of hearing from the acoustic signal of each channel converted by the frequency domain conversion unit 30. At this time, the masking threshold calculation unit 40 applies a model in consideration of the spatial masking effect, and then it calculates the masking threshold in the frequency domain. The calculation of the masking threshold in the frequency domain itself can be achieved by, for example, the method as described in Non-Patent Document 1.

Alternatively, the masking threshold calculation unit 40 may be able to acquire a sound source object and similarly calculate the masking threshold corresponding to the spatial masking effect of the auditory perception. The sound source object represents each of a plurality of an acoustic signal generated from spatially different positions. For example, the sound source object is an acoustic signal with position information. This may be, for example, an output signal of a microphone for recording each instrument of an orchestra, an audio signal performed sampling for using in a game, or the like, converted into the acoustic signal in the frequency domain.

Further, the masking threshold calculation unit 40 may be able to calculate frequency masking by acquiring or converting the acoustic signal that is once performed sound acquisition and stored in a recording medium such as a flash memory, a HDD, an optical recording medium, or the like.

Specifically, as the model of the above-mentioned spatial masking effect, the masking threshold calculation unit 40 is also possible to calculate the masking threshold corresponding to the spatial masking effect based on spatial distance and/or direction between each of the channels and/or each of the sound source objects according to position and direction information of a listener.

Alternatively, the masking threshold calculation unit 40 may calculate the masking threshold corresponding to the spatial masking effect based on the spatial distance and/or direction between each of the channels and/or each of the sound source objects.

More specifically, the masking threshold calculating section 40 may calculate the masking threshold corresponding to the spatial masking effect that closer spatial distance and/or direction between the channels and/or the sound source objects, greater influence on each other, and the farther away, smaller influence on each other.

In addition, the masking threshold calculating section 40 may calculate the masking threshold corresponding to the spatial masking effect in a manner that, for a channel and/or a sound source object symmetrically positioned with respect to the frontal plane of the listener, the degree of mutual influence on the spatial distance and/or direction between the sound source objects is changed.

Further, the masking threshold calculation output unit 40 may calculate the masking threshold corresponding to the spatial masking effect that, for a channel and/or a sound source object located at a rear position with respect to the listener, the channel and/or the sound object is considered to exist in front of front-back symmetrical position.

Specifically, when calculating the masking threshold, the masking threshold calculation unit 40 may be adjusted by the following equation (1).

$$T=\beta\{\max(y1,\alpha y2)-1\}$$

$$y1=f(x-\theta)$$

$$y2=f(180-x-\theta) \qquad \text{equation (1)}$$

where, T is a weight for multiplying to the masking threshold in the frequency domain of each channel signal in order to calculate the masking threshold, θ is direction of the masker, a is a constant controlled by the frequency of the masker, β is a constant controlled according to whether the masker signal is a tone-like signal or a noise-like signal, and x indicates the direction for calculation or direction of the maskee.

More specifically, in the present embodiment, the sound that interferes with hearing is referred to as "masker", and the sound that is interfered with hearing is referred to as "maskee." The "max" is a function that returns the maximum value in the argument. As for the constant, it is possible to use a value such as α=1 when the masker is 400 Hz and α=0.8 when the masker is 1 kHz. When the masker is noise-like, δ=11 to 14, and when the masker is pure tone (as refer to "tone-like"), a value of δ is about 3 to 5 can be used. That is, when the masker is tone-like, T is flat for all θ regardless of the value of x.

For f(x) in this equation (1), for example, a linear function such as a triangular wave as shown in the following equation (2) can be used.

[Number 1]

$$f(x)=\begin{cases}-\frac{1}{90}x+1 & (0^\circ \le x \le 180^\circ) \\ \frac{1}{90}x-2 & (180^\circ \le x \le 360^\circ)\end{cases} \qquad \text{EQUATION (2)}$$

In these, desired direction or direction of maskee can be used for x. This direction corresponds to the direction of the beamforming of the microphone, the direction of the sound source object, and the like.

In addition, as f(x), an equation such as f(x)=cos(x) can also be used. Further, other than the above, as f(x), functions such as, for example, a function calculated from the experimental results of an actual masker and maskee, and the like can be used.

The masking threshold calculating unit 40 may calculate the masking threshold corresponding to the spatial masking effect that degree of mutual influence of the signal of each of the channels and/or the sound source object is changed according to whether the signal of each of the channels and/or the sound source object is a tone-like signal or a noise-like signal.

The information amount determination unit 50 determines the amount of information to be allocated to the sound source object by the masking threshold calculated by the masking threshold calculation unit 40. In the present embodiment, as the amount of information, bits of each acoustic signal are assigned based on the masking threshold. As this bit allocation, the information amount determination unit 50 is possible to calculate, by using the Perceptual Entry (hereinafter referred to as "PE"), the average number of bits per sample corresponding to the masking threshold calculated by the masking threshold calculation unit 40.

The encoding unit 60 encodes the acoustic signal of the plurality of channels and/or the sound source object and the position information of the sound source object by each of the allocated amount of information. In the present embodiment, the encoding unit 60 quantizes each acoustic signal based on the number of bits allocated by the information amount determination unit 50 and transmits it to the transmission line. For this transmission line, for example, Bluetooth (registered trademark), HDMI (registered trademark), Wi-Fi, USB (Universal Serial Bus), and other wired and wireless information transmission method can be used. More specifically, it can be transmitted by peer-to-peer communication via a network such as the Internet or WiFi.

The direction calculation unit 70 calculates the direction to which the listener is facing. The direction calculation unit 70 includes, for example, an acceleration sensor, a gyro sensor, a geomagnetic sensor, and the like, capable of head tracking, and a circuit that converts these outputs into direction information.

On this basis, the direction calculation unit 70 is possible to calculate position direction information by adding the position information in consideration of the positional relationship between the sound source object and the acoustic signal of the plurality of channels against to the listener to the calculated direction information.

The transmission unit 80 transmits the position direction information calculated by the direction calculation unit 70 to the encoding device 1. The transmission unit 80 is possible to transmit the position direction information so as to be receivable by the masking threshold calculation unit 40, for example, via wire or wireless transmission as similar to the transmission path of the acoustic signal.

The decoding unit 90 decodes the acoustic signal of the plurality of channels and/or the sound source object encoded by the encoding device 1 into the audio signal. For example, the decoding unit 90 first dequantizes the signal received from the transmission line. Then, it returns the signal in the frequency domain to the time domain by using IDFT (Inverse Discrete Fourier Transform), IMDCT (Inverse Modified Discrete Cosine Transform), or the like, and converts into the audio signal for each channel.

The three-dimensional sound reproduction unit 100 converts the audio signal decoded by the decoding unit 90 into a three-dimensional sound signal that reproduces the three-dimensional sound for the listener. Specifically, the three-dimensional sound reproduction unit 100 considers the beam signal for each direction returned to the time domain as the signal emitted from the sound source in that direction and convolutes HRTF (Head-Related Transfer Function) in the beam direction, respectively. The HRTF expresses the change in sound caused by the peripheral objects including the auricle, the human head and the shoulder as a transfer function.

Next, the signal in which the HRTF is convoluted is weighted for each beam direction and then added to generate a two-channel binaural signal to be presented to the listener. Among these, the beam direction-specific weighting is a process of weighting the binaural signals, which are the L signal and the R signal, to get closer to what binaural signals in the sound space to be reproduced. Specifically, a binaural signal is generated by convolving and adding HRTFs in the sound source direction, respectively, to each sound source existing in a certain sound space. This binaural signal is used as a target signal, and a process of adding a weight to the output signal is performed so that the binaural signal obtained as an output becomes equal to the target signal.

In addition to the masking threshold described above, the three-dimensional sound reproduction unit 100 can update the HRTF and reproduce the three-dimensional sound based on the position and direction information calculated by the direction calculation unit 70.

The headphone 110 is a device for the listener to reproduce the decoded and three-dimensionalized sound. The headphone 110 includes a D/A converter, an amplifier, an electromagnetic driver, earmuffs worn by the user, and the like.

In addition to this, the encoding device 1 and the decoding device 2 include, for example, a control unit that is a control calculation part as various circuits, such as an ASIC (Application Specific Processor), a DSP (Digital Signal Processor), a CPU (Central Processing Unit), MPU (Micro Processing Unit), GPU (Graphics Processing Unit), or the like.

In addition, the encoding device 1 and the decoding device 2 include a storage unit that is a semiconductor memory such as ROM (Read Only Memory) and RAM (Random Access Memory), or the like, a magnetic recording medium such as HDD (Hard Disk Drive), or the like, optical recording medium, or the like, as a storage part. A control program for performing each method according to the embodiment of the present invention is stored in the storage unit.

Further, the encoding device 1 and the decoding device 2 may include display part such as a liquid crystal display, an organic EL display, or the like, input part such as a keyboard, a pointing device such as a mouse and a touch panel, or the like, an interface such as a LAN board, a wireless LAN board, serial, parallel, USB (Universal Serial Bus), or the like.

Further, the coding device 1 and the decoding device 2 are mainly executed by the control unit using various programs stored in the storage part so that each method according to the embodiment of the present invention can be realized by using hardware resources.

In addition, a part or any combination of the above-mentioned configurations may be configured in terms of hardware or circuit by IC, programmable logic, FPGA (Field-Programmable Gate Array), or the like.

Acoustic Encoding/Decoding Process by Acoustic System X

Figure 2:
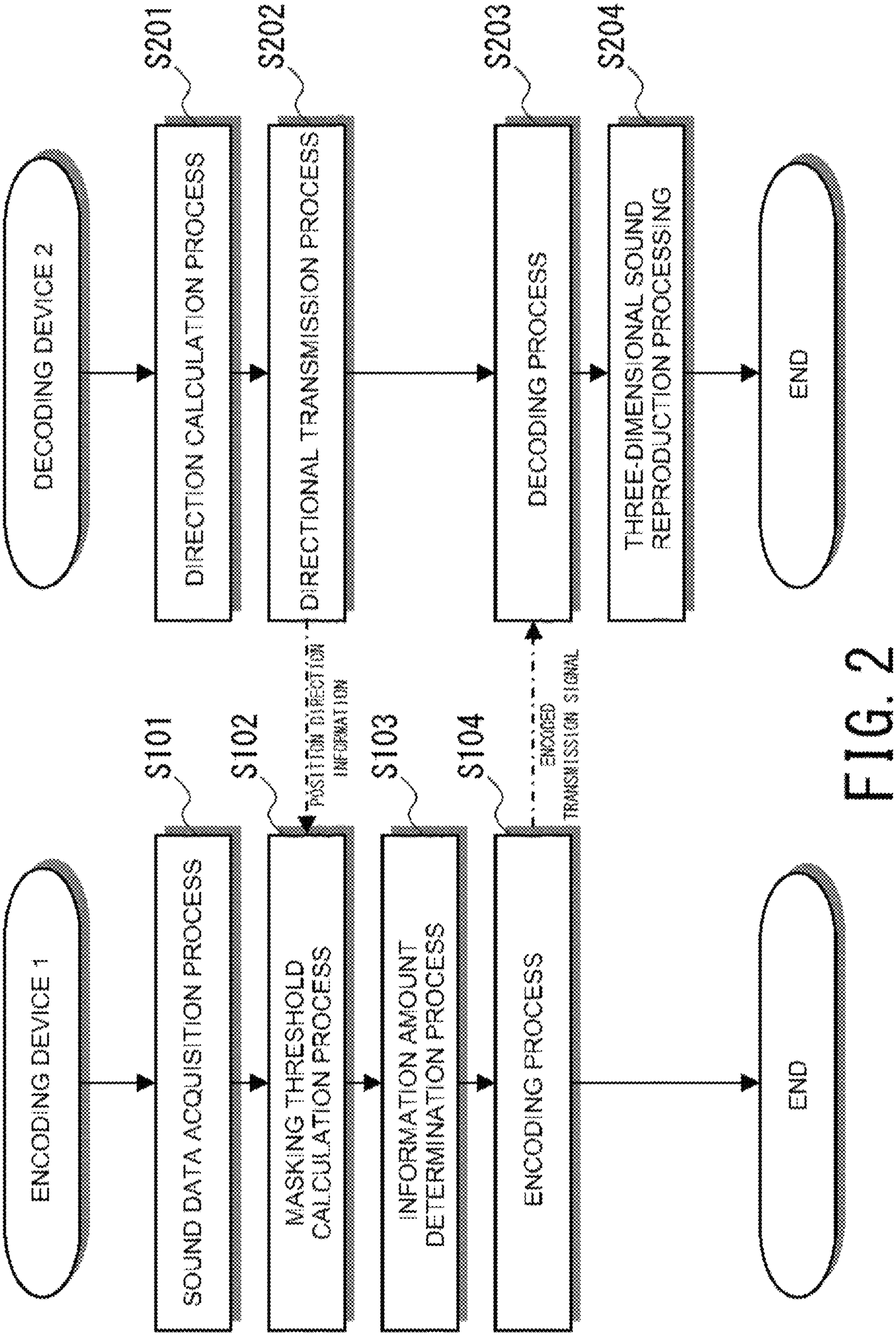
FIG. 2 is a flowchart of an acoustic encoding/decoding process according to the embodiment of the present invention.

Next, with reference to FIGS. 2 and 3, the acoustic signal encoding/decoding process by the acoustic system X according to the embodiment of the present invention is described.

Acoustic signal encoding and decoding process of the present embodiment, mainly in the encoding device 1 and decoding device 2, in each device, the control unit controls and executes the control program stored in the storage unit with cooperating with each unit by using hardware resources, or executes it directly in each circuit.

Hereinafter, with reference to the flowchart of FIG. 2, the details of the acoustic signal encoding/decoding process is described step by step.

Step S101

Firstly, the frequency domain conversion unit 30 of the encoding device 1 performs audio data acquisition processing.

Here, a sound collecting person goes to a stadium, or the like, and collects sound by using the microphone array 10. As a result, audio signals in each direction (θ) centered on the microphone array 10 are acquired. At this time, on the sound collecting side, sound is collected based on the concept of "spatial sampling." The spatial sampling spatially divides sound field and collects sound in multiple channels. In the present embodiment, for example, the audio signal of a specific step divided from 0 degree to 360 degree on the left and the right is acquired corresponding to the plurality of channels. Here, it is also possible to collect sound by dividing it into specific steps even for 0 degree to 360 degree in the vertical direction.

The frequency domain conversion unit 30 cuts out these collected audio data, and the like, converts them into signals in the frequency domain from the time domain by DFT, MDCT, and the like, and stores them in the storage unit as the acoustic signal(s).

Step S201

Here, the direction calculation unit 70 of the decoding device 2 performs the direction calculation process.

The direction calculation unit 70 calculates the direction information to which the listener is facing and the position information with respect to the acoustic data.

Step S202

Next, the transmission unit 80 performs the directional transmission process.

The transmission unit 80 transmits the position direction information calculated by the direction calculation unit 70 to the encoding device 1.

Step S102

Here, the masking threshold calculation unit 40 of the encoding device 1 performs the masking threshold calculation process. In the present embodiment, the masking threshold T is calculated in the frequency domain, the masking threshold for the spatial masking as described later is further calculated, and the bit allocation is determined. Therefore, the masking threshold calculation unit 40 first calculates the masking threshold T in the frequency band.

Figure 3A:
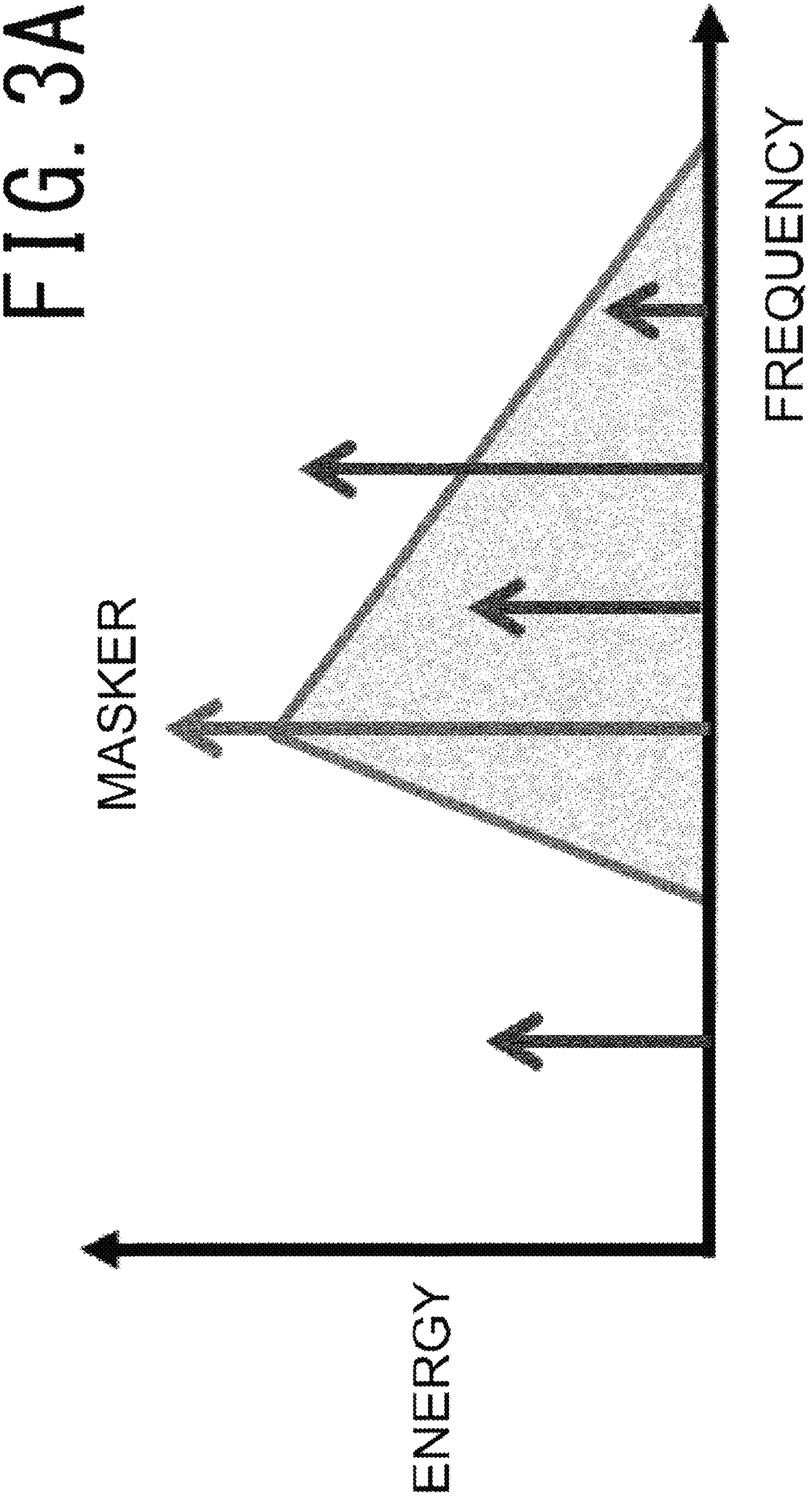
FIG. 3A is a conceptual diagram of the acoustic encoding/decoding process as shown in FIG. 2.

With reference to FIG. 3A, the masking effect in hearing is described. The masking effect in hearing is an effect that makes it difficult for one sound to be heard due to the presence of another sound. Hereinafter, the sound that interferes with hearing is referred to as "masker", and the sound that is interfered with hearing is referred to as "maskee".

The masking effect is roughly classified into frequency masking (simultaneous masking) and time masking (temporal masking). Frequency masking is masking that occurs when the masker and maskee overlap in time, and time masking is masking that occurs when they are separated in time.

In the graph of FIG. 3A, the horizontal axis represents frequency and the vertical axis represents signal energy. That is, FIG. 3A shows, when one certain spectrum (pure tone) included in a certain signal is used as a masker, a graph of an example of range and threshold of the spectrum (maskee) masked by this masker. In this way, the masking threshold also rises in the vicinity of the frequency of the masker in which the signal component does not exist. Also, the frequency range in which the threshold rises is not symmetrical with respect to the masker's frequency, and higher maskee frequencies to the masker are more likely to be masked than lower frequency sounds. Therefore, as auditory perception, a situation arises in which a masked area has not only the frequency of the masker itself but also components that spread on both sides of the masker.

Figure 3B:
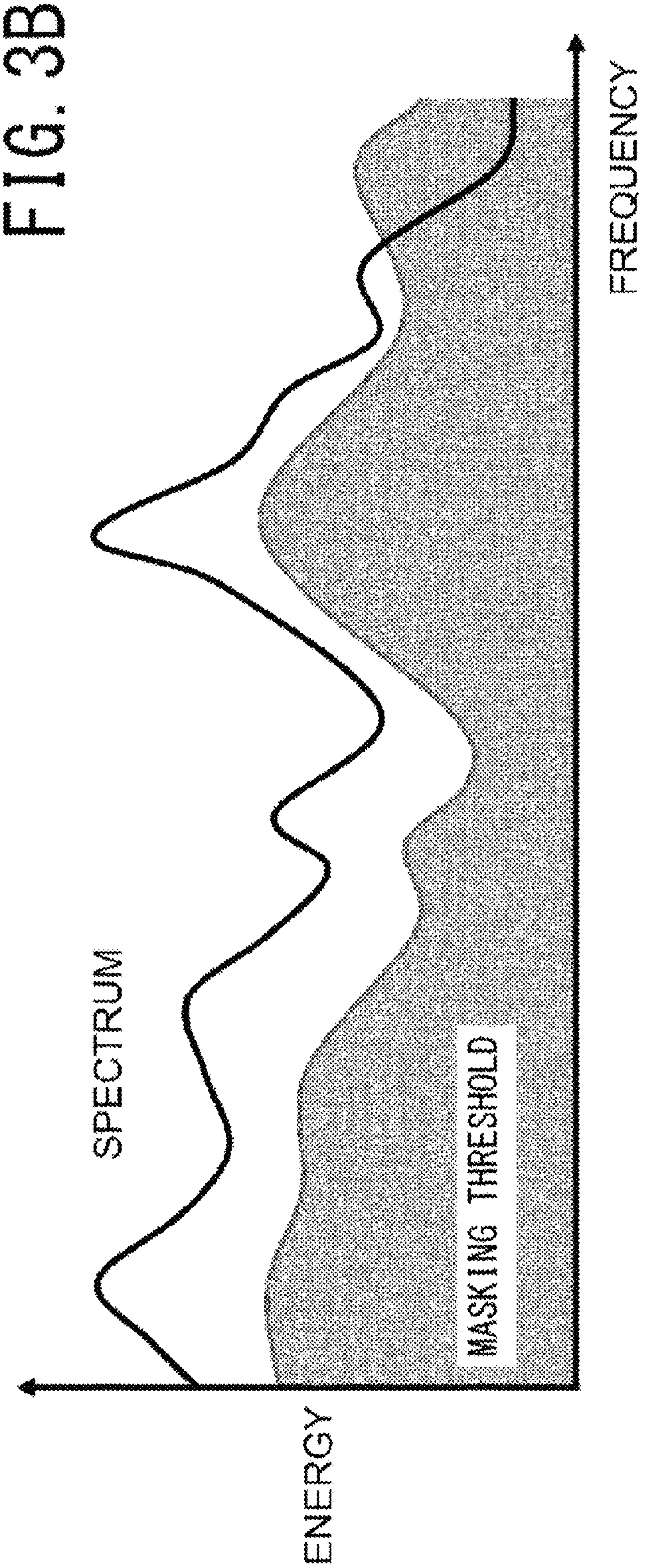
FIG. 3B is a conceptual diagram of the acoustic encoding/decoding process as shown in FIG. 2.

FIG. 3B shows the concept of frequency masking application in encoding. In this graph, the horizontal axis is frequency and the vertical axis is signal energy. The thick black curve represents the spectrum of the signal. The gray curve represents the masking threshold. Here, the filled area in FIG. 3B is a portion that is masked by frequency masking and is not perceived. At this time, in FIG. 3B, the portion that actually contributes to the perception of sound is the portion sandwiched between the curve representing the spectrum of the signal and the curve representing the masking threshold. Further, a frequency in which the energy of the signal spectrum is smaller than the masking threshold, such as the high frequency band in FIG. 3B, does not contribute to sound perception. That is, by allocating only the bits corresponding to the energy calculated by subtracting the masking threshold from the energy of the signal spectrum, it is possible to transmit the signal in a state in which degradation is not perceived in auditory perception. In this way, by using the masking effect in the frequency domain, it is possible to reduce the number of bits required for transmission while maintaining perceptual audio quality.

In addition, the curve representing the masking threshold over the entire band as shown in FIG. 3B can be obtained by calculating the masking threshold for each frequency component by using the knowledge of masking for a single spectrum or noise and integrating them.

Here, a detailed calculation method of the masking threshold value T in this frequency band is described.

For example, the masking threshold calculation unit 40 convolves a masking threshold calculation equation in the Bark spectrum (Spreading Function, hereinafter referred to as "SF") as described in Patent Document 1. Then, the masking threshold calculation unit 40 calculates the Spread masking threshold value $T_{spread}$ by using the Spectral Flatness measurement (SFM) and the adjustment coefficient. Then, the masking threshold calculation unit 40 calculates a temporary threshold value T by returning the Spread masking threshold value $T_{spread}$ to the region of the Bark spectrum by deconvolution. On this basis, in the present embodiment, the masking threshold calculation unit 40 divides the temporary threshold value T by the number of DFT spectra corresponding to each Bark index and then compares it with the absolute threshold value, and thus the temporary threshold value T is converted to the final threshold value Tonal for frequency masking.

More specifically described, as an absolute threshold value that the masking threshold calculation unit 40 compares with the temporary threshold value T, the approximate equation $T_{qf}$ [dBSPL] of the absolute threshold value at the frequency f(Hz) is calculated by the following equation (3).

$$T_{qf}=3.64(f/1000)^{-08}-6.5 \quad \exp\{-0.6(f/1000-3.3)^2\}+10^{-3}(f/1000)^4+O_{LSB} \qquad \text{equation (3)}$$

Here, the $O_{LSB}$ added in the equation (3) is an offset value such that the absolute threshold value $T^{q4000}$=min ($T_{qf}$) at a frequency of 4 kHz matches the energy of the signal having a frequency of 4 kHz/amplitude of 1 bit.

Specifically, the masking threshold calculation unit 40 calculates the threshold value $T_{final}$ in the i-th frequency band (final band) of frequency masking by the following equation (4).

[Number 2]

$$T_{final_i} = \max\left(\frac{T_i}{K_i},\ 10\frac{T_{q\_mean_i}}{10}\right) \qquad \text{Equation (4)}$$

$$T_{q\_mean_i} = \frac{T_{q_{bl_i}} + T_{q_{bh_i}}}{2}$$

$$\begin{cases} bl_i\text{: LOWER LIMIT OF } i\text{-}th \text{ CRITICAL BAND} \\ bh_i\text{: UPPER LIMIT OF } i\text{-}th \text{ CRITICAL BAND} \\ T_i\text{: MASKING THRESHOLD (IN BARK REGION)} \\ \quad \text{IN } i\text{-}th \text{ CRITICAL BAND} \\ k_i\text{: NUMBER OF } FFT \text{ SPECTRA CORRESPONDING} \\ \quad \text{TO } i\text{-}th \text{ CRITICAL BAND} \end{cases}$$

On this basis, the masking threshold calculation unit 40 further calculates a masking threshold corresponding to the spatial masking effect of hearing from the threshold value $T_{final}$ of this frequency band. At this time, the masking threshold calculation unit 40 calculates the frequency masking threshold in consideration of spatial masking by using the direction information of the acoustic signal.

Figure 3C:
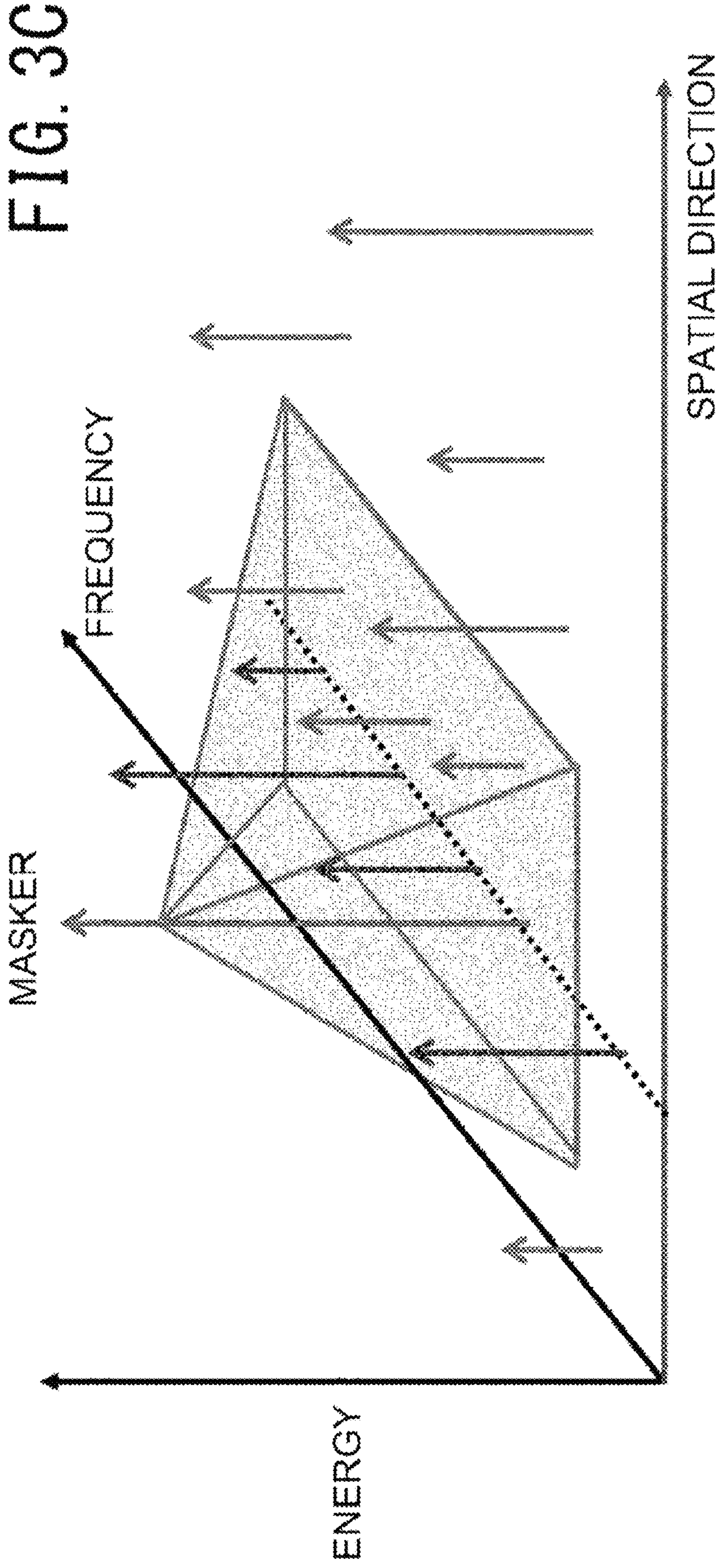
FIG. 3C is a conceptual diagram of the acoustic encoding/decoding process as shown in FIG. 2.

With reference to FIG. 3C, the masking threshold corresponding to the spatial masking effect of hearing is described.

In the calculation of the masking threshold in the typical acoustic encoding method, in many cases, the masking threshold of the own channel is calculated using only the signal component of the own channel. That is, in an acoustic signal having a plurality of channels, the masking threshold is determined independently for each channel without considering masking by signals of channels other than the target channel for masking of the target channel.

Here, it is considered that the spatially sampled acoustic signal as used in the present embodiment has a large signal correlation between adjacent channels, and some parts with similar waveforms and some parts with different waveforms are mixed. Therefore, from the viewpoint of masking, there is a possibility that the masking information in each channel can be applied between the channels, mutually, for encoding the spatially sampled signal. Therefore, in the present embodiment, "spatial masking" in which the masking effect is extended to the spatial region is used for encoding the spatially sampled signal.

In the conceptual diagram of FIG. 3C, the horizontal axis represents the spatial direction of the signal, the depth axis represents the frequency, and the vertical axis represents the energy of the signal. The area inside the quadrangular pyramid at the base of the masker's signal represents the area that is to be masked by this signal. As compared with the frequency masking of FIG. 3B, it can be seen that the dimension of the direction is added in FIG. 3C and the dimension is increased by one. Further, the spatial direction includes an azimuth angle and an elevation angle. As shown in FIG. 3C, in spatial masking, the curve representing the masking threshold is three-dimensional. That is, masking also extends in the spatial direction, and a signal to be masked is generated. In such a spatial masking, it becomes a masking related to the central auditory system where binaural information interacts.

Figure 4:
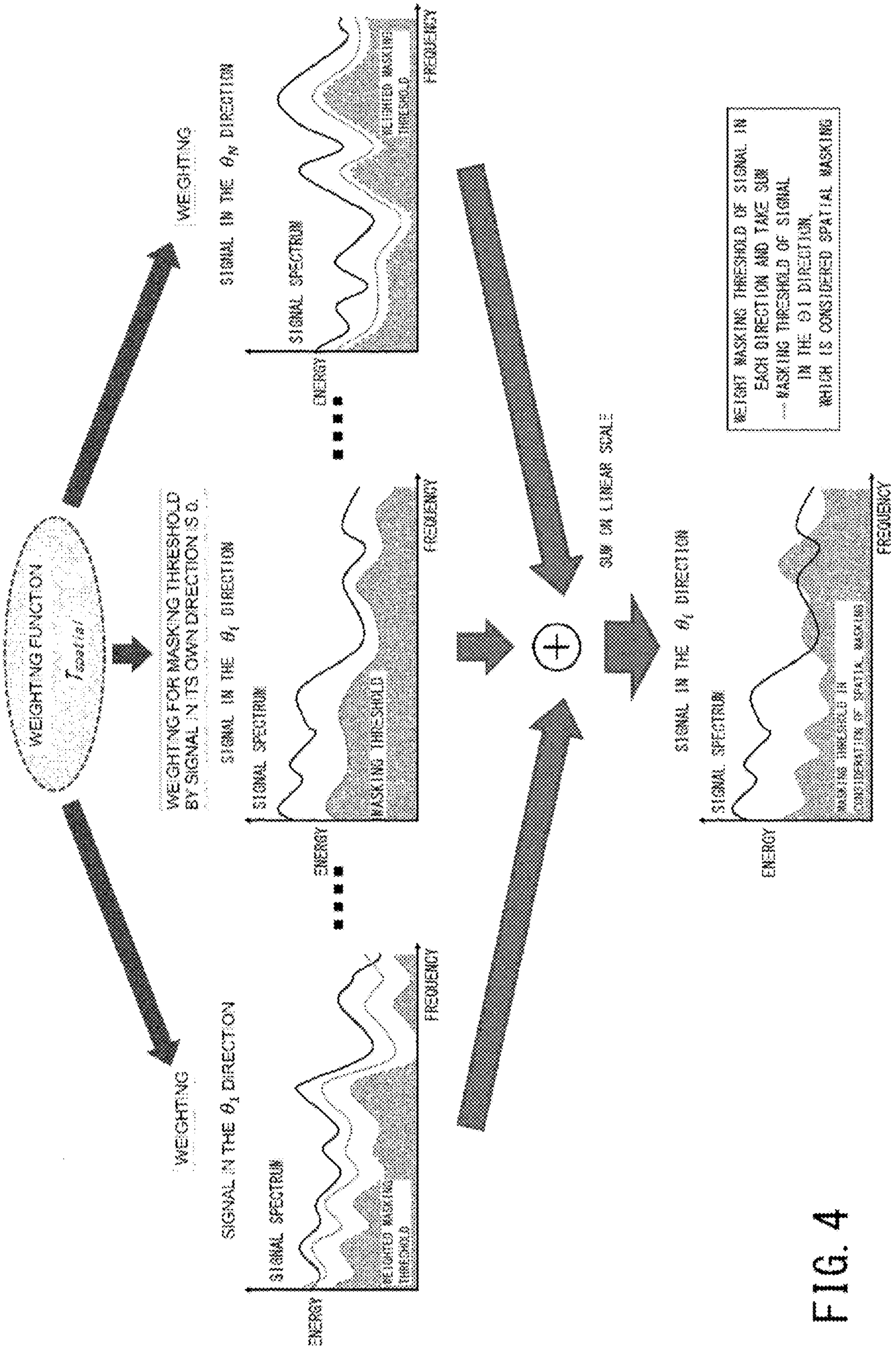
FIG. 4 is a conceptual diagram of the acoustic encoding/decoding process as shown in FIG. 2.

With reference to FIG. 4, the calculation of the masking threshold of spatial masking is described. FIG. 4 is an example of calculating the masking threshold in consideration of the spatial masking for the signal in the i-th direction among the signals in the N-th direction from 1 to N-th. In each graph, the horizontal axis is frequency, and the vertical axis is signal energy. Also in each graph, the solid black line represents the signal spectrum, and the solid gray line represents the masking threshold calculated by them. The black dashed line is the weighting of the masking threshold of the signal in each direction. The gray dotted line represents the masking threshold of the signal in the i-th direction, which is considered all the masking by the signal in each direction.

More specifically, the present inventors created a masking model in consideration of spatial masking in an omnidirectional sound source based on the results of listening experiments of the Example as described later, and it is calculated below.

The calculation procedure is as follows. At first, for each direction of the signal, the masking threshold is calculated in the same way as the typical frequency domain masking. Next, in order to obtain the masking threshold T in each of those directions, the weight to be multiplied by the masking threshold value in the frequency domain of each channel signal is calculated by the function $T_{spatial}(\theta, x)$ corresponding to the above equation (1) and weighted, respectively. However, the weighting for the masking threshold of the signal itself, that is, the i-th direction, is set to zero dB, that is, 1 in the linear scale. Next, the weighted masking thresholds in all the directions are summed in a linear scale. As a result, a masking threshold of the signal in the i-th direction in consideration of the spatial masking can be acquired. By performing the above processing in the same manner for signals in other directions, it is possible to acquire the threshold value in consideration of the spatial masking for signals all around.

The details of the function $T_{spatial}$ is described below. The function $T_{spatial}$ is a function that outputs the amount of attenuation of the masking threshold value from the direction in which the masker exists in decibels when entering the direction of the masker and the direction of the maskee as variables.

In this embodiment, the direction of the masker is set to [deg.], the direction of the maskee is x[deg.], the function $T_{spatial}(\theta, x)$ [dB] is calculated by the following equation (4-2).

$$T_{spatial}(\theta,x)=\beta\{\max(f(x-\theta),\alpha f(180\ \text{degree}-x-\theta))-1\} \quad \text{equation (4-2)}$$

Here, α and β are scaling coefficients, and $0\le\alpha\le1$, $0\le\beta$. "max" is a function that returns the maximum value in the argument. "f" may be an arbitrary periodic function with a period of 360 degree that takes the maximum value at a phase of 0 degree.

In the present embodiment, as the periodic function f(x), for example, a triangular wave similar to the above equation (2) can be used. When the function f is defined in this way, f(x−θ) becomes 0 dB in the direction in which the masker exists, and the threshold change is such that the level is minimized in the opposite direction, that is, in the direction advanced to 180 degree. On the other hand, the change of the threshold value is shown that f(180−x−θ) is 0 dB in the front-back symmetric direction with respect to the direction in which the masker exists, and the level is minimized in the opposite direction, that is, in the direction advanced by 180 degree. In other words, in order to express "attenuation of the threshold value from the direction in which the masker exists" and "attenuation of the threshold value from the direction front-back symmetrical with respect to the direction in which the masker exists", respectively, by preparing two phase-matched functions f and taking their maximum value and scaling, it is possible to calculate a masking threshold that expresses the two phenomenon that "phenomenon that the threshold decreases as the maskee is away in direction from the masker" and "the phenomenon that the threshold is folded back at the coronal plane" at the same time.

The scaling coefficient α ($0\le\alpha\le1$) is a coefficient to reflect the masking effect that "the lower the frequency (center frequency) of the masker, the more significantly the threshold rises when the maskee is at a front-back symmetrical direction of the masker." The α is determined so that the lower the masker frequency, the closer to 1, and the higher the masker frequency, the closer to 0. In doing so, f(180−x−θ) is scaled according to the frequency of the masker, and it is possible to adjust the degree of folding back of the threshold value at the coronal plane.

The scaling coefficient β ($0\le\beta$) is a coefficient for reflecting the finding that "when the masker is a pure tone, the change in the threshold value depending on the direction of the maskee is flat". The β is determined so that the tonality of the masker is tone-like, it becomes closer to 0, and the tonality of the masker is noise-like, the value becomes larger. By doing so, it becomes possible to adjust the fluctuation width of the value of the function $T_{spatial}$ as a whole when θ and x change according to whether the masker is a pure tone or noise.

As described above, in the present embodiment, the weight T that multiplies the masking threshold in the frequency domain of each channel signal is applied. By adding the frequency domain masking thresholds in each direction multiplied by this weight, the masking threshold (on the frequency axis) in the direction (x direction) can be calculated.

In addition, as shown in the Example, as α and β, it is also possible to calculate the optimum values corresponding to the frequency and SFM by exhaustive computation in an actual experiment and apply these as a table.

Step S103

Next, the information amount determination unit 50 performs the information amount determination process.

In the acoustic system X of the present embodiment, the direction information of the spatially sampled signal is used, and bit allocation in consideration of the spatial domain is performed in the frequency domain. In addition, a masking effect is used to allocate bits in consideration of the spatial region.

Therefore, the information amount determination unit 50 determines the amount of information to be allocated to each channel and/or the sound source object based on the masking threshold calculated by the masking threshold calculation unit 40. By using the masking threshold corresponding to the spatial masking effect of hearing, it is possible to perform bit allocation on the frequency axis in consideration of the spatial region. That is, by using the spatial masking effect in auditory perception, the number of bits of the signal required for transmission can be reduced while maintaining perceptual audio quality.

In the present embodiment, the information amount determination unit 50 calculates the bit allocation as the information amount by using, for example, PE in order to positively utilize the masking effect in auditory perception. PE is a calculation of the average amount of information having in a music signal where the signal below the masking threshold has no information meaningful to human hearing, that is, as something that may be buried in quantization noise.

This PE can be calculated by the following equation (5).

[Number 3]

EQUATION (5)

$$PE(j) = \frac{1}{N}\sum_{i=1}^{25}\sum_{\omega=bl_i}^{bh_i}\left\{\log_2\left(s\left|\text{round}\left(\frac{\text{Re}(X(\omega))}{\sqrt{6T_i/k_i}}\right)\right|+1\right)+\log_2\left(2\left|\text{round}\left(\frac{\text{Im}(X(\omega))}{\sqrt{6T_i/k_i}}\right)\right|+1\right)\right\}\text{[bits/sample]}$$

-continued $N$: NUMBER OF SAMPLES IN FRAME
$bl_i$: LOWER LIMIT OF $i\text{-}th$ CRITICAL BAND
$bh_i$: UPPER LIMIT OF $i\text{-}th$ CRITICAL BAND
$T_i$: MASKING THRESHOLD IN $i\text{-}th$ CRITICAL BAND
$k_i$: NUMBER OF $FFT$ SPECTRA CORRESPODING TO i-th CRITICAL BAND
$X(\omega)$: COMPLEX SPECTRUM OF EACH CHANNEL SIGNAL Here, $T_i$ becomes the threshold value of the critical band in the Bark scale, and it is inserted as $T_i/k_i = T_{final\ i}$.

Step S104

Next, the encoding unit 60 performs the encoding process.

The encoding unit 60 encodes the acoustic signal of the plurality of channels and/or the sound source object and the position information of the sound source object with the allocated amount of information, respectively.

The encoded data is transmitted to the decoding device 2 on the receiving side. This transmission is performed by, for example, peer-to-peer communication. Alternatively, it may be downloaded as data or read into the decoding device 2 as a memory card or an optical recording medium.

Step S203

Here, the decoding unit 90 of the decoding device 2 performs the decoding process.

The decoding unit 90 decodes the acoustic signal of the plurality of channels and/or the sound source object encoded by the encoding device 1 into the audio signal. Specifically, when the decoding device 2 is a smartphone, or the like, the acoustic signal transmitted by the encoding device 1 is decoded by a decoder, or the like, of a specific codec, or the like.

Step S204

Next, the three-dimensional sound reproduction unit 100 performs the three-dimensional sound reproduction processing.

Three-dimensional sound reproducing unit 100 converts the audio signal decoded by the decoding unit 90 into a three-dimensional signal that is like reproducing the three-dimensional sound for the listener.

Specifically, the three-dimensional sound reproduction unit 100 reproduces a multi-channel audio signal as a two-channel audio signal while including spatial information. This can be achieved by adding the sound transmission characteristics from the sound source to the human ear to each audio signal and adding them in all directions. That is, the three-dimensional sound reproduction unit 100 synthesizes sound signals for each direction and playback them by using headphones. Therefore, the head-related transfer function (HRTF) corresponding to the direction of each audio signal is convolved and converted into a two-channel audio signal. Specifically, the three-dimensional sound reproduction unit 100 adds, for example, the transmission characteristics of the HRTF corresponding to the direction of each signal to each sound signal, and outputs the sum of the signals in each of the L channel and the R channel. As a result, it is possible to easily reproduce as a two-channel audio signal by headphones without depending on the number of channels on the sound collecting side.

As described above, the acoustic signal encoding/decoding process according to the embodiment of the present invention is completed.

As configured in this way, the following effects can be attained.

In recent years, with the increasing number of channels in the sound reproduction environment or the spread of binaural reproduction in AR (Augmented Reality) and VR (Virtual Reality), importance of sound acquisition, transmission, reproduction, and emphasis technology of 3D sound field is increasing.

Here, in the encoding of the spatially sampled signal, it is necessary to target the sound signal all around the listener, so that the number of channels becomes enormous as the sampling direction increases, and a higher total bit rate is required.

As an example, by using a smartphone, or the like, considering transmission via the Internet. In Spotify (registered trademark), which is one of the music distribution services, the bit rate during streaming playback is about 320 kbps at the maximum for 2-channel stereo. Since it is assumed that signals with more than two channels are transmitted in spatial sampling, it is necessary to lower the bit rate per channel.

On the other hand, typically, the encoding of the audio signal (data compression such as MPEG, or the like), the masking effect of the hearing have been utilized. However, the masking has mainly used only the masking effect in the frequency domain. In the acoustic encoding of MPEG-2 AAC, MPEG-4 AAC, MP3, or the like, and in the encoding of multi-channel signals, the auditory masking effect in the frequency domain for each channel has been used.

However, a sound field generally represented by a multi-channel signal is composed of a plurality of spatially scattered sound sources. About this, regarding mutual masking effect and hearing when multiple sound sources are spatially arranged at the same time, its action and effect have not been clarified, and it has not been applied. In other words, nothing was known about what kind of masking effect the sound sources arranged in the three-dimensional space give each other and how they influence each other to form the perception of hearing. That is, the typical calculation of the masking threshold does not consider the spatial relationship between channels.

On the other hand, the encoding device 1 according to the embodiment of the present invention is characterized that an encoding device that encodes an acoustic signal of a plurality of channels and/or a sound source object and position information of the sound source object, including; a masking threshold calculation unit 40 that calculates a masking threshold corresponding to spatial masking effect of hearing; an information amount determination unit 50 that determines the amount of information to be allocated to each channel and/or the sound source object based on the masking threshold calculated by the masking threshold calculation unit 40; and an encoding unit 60 that encodes the acoustic signal of the plurality of the channels and/or the sound source object and the position information of the sound source object by each of allocated amount of information.

As configured in this way, when encoding a multi-channel acoustic signal or sound source object and its position information, by determining the number of bits to be allocated to each channel and sound source object in consideration of the spatial masking effect of hearing, it can be applied to the compression of multi-channel signals with directional information. This enables encoding in consideration of the spatial relationship between the channels.

Here, in the typical calculation of the masking threshold, the spatial relationship between the channels is not considered; therefore, for an acoustic signal with a large number of channels, such as 22.2 channel acoustics, or the like, which enhances the sense of presence, compression by bit allocation cannot be sufficiently performed, and thus there is a risk that the bit rate (bandwidth) during transmission may be insufficient.

On the other hand, in the acoustic signal encoding method according to the embodiment of the present invention, the sound field represented by the multi-channel signal is composed of a plurality of spatially scattered sound sources. Since the spatially sampled signal includes spatial information, it is possible to further reduce the number of transmission bits by allocating bits in consideration of the spatial domain in addition to the typical frequency domain.

This makes it possible to provide an acoustic signal encoding method capable of encoding an acoustic signal having a large number of channels such as 22.2 channels with a sufficient quality at a given bit rate. That is, for a plurality of sound sources that are scattered spatially, the bit rate can be reduced by calculating the masking threshold based on the mutual masking effect and allocating bits based on the threshold. According to the experiments of the present inventors, it is possible to reduce the bit rate by 5 to 20% as compared with the typical case.

The Acoustic system X according to the present invention is characterized that having an encoding apparatus 1 and a decoding device 2, wherein the decoding device 2 includes: a direction calculation unit 70 that calculates a direction to which the listener is facing, a transmission unit 80 that transmits the direction calculated by the direction calculation unit 70 to the encoding device 1, a decoding unit 90 that decodes the acoustic signal of the plurality of channels and/or the sound source object encoded by the encoding device 1 into an audio signal; and the masking threshold calculation unit 40 of the encoding device 1 calculates the masking threshold corresponding to the spatial masking effect based on spatial distance and/or direction between each of the channels and/or between each of the sound source objects according to position and direction of the listener.

As configured in this way, when decoding an acoustic signal encoded with coding by using a masking threshold corresponding to the above-mentioned spatial masking effect of hearing, it is possible to realize an auditory display that controls the position of the sound image by calculating the direction information to which the listener is facing by head tracking, or the like. That is, it is possible that the relative positional relationship between the position of the sound source of each channel or the position of the sound source object and the listener is fed back to the encoding device 1, and coding and decoding based on the positional relationship is performed.

This makes it possible to provide an acoustic system that allows users to easily acquire, transmit, reproduce, and enjoy the 360 degree sound space of the whole celestial sphere.

Typically, 3D (three-dimensional) sound field reproduction technology that includes binaural/transoral auditory display technology for enjoying music, broadcast, and movie content as surround with headphones and two front speakers, sound field reproduction technology that simulates the sound field of an existing hall or theater in a 5.1-channel or 7.1-channel surround playback environment for home theaters, or the like, have been developed. Furthermore, the development of three-dimensional sound field reproduction technology by using wave field synthesis by speaker array is also in progress. With the evolution of such reproduction methods, multi-channel sound acquisition and content representation have become common.

However, as a three-dimensional sound reproduction technology, although performing a form relating to the head-related transfer function and localization have been actively performed, the relationship with spatial masking has not been investigated.

On the other hand, in the acoustic system according to the present invention, the decoding device 2 is characterizing in that further provided is a three-dimensional sound reproduction unit 100 that converts the audio signal decoded by the decoding unit 90 into a three-dimensional sound signal that reproduces the three-dimensional sound for the listener.

With this configuration, the acoustic signal that is efficiently encoded by applying the interrelationships of multiple sound sources scattered in the sound field in three-dimensional space and the masking effect can be reproduced in 2 channels in association with the head-related transfer function (HRTF) with respect to the perception of spatial acoustic signals. That is, by reproducing the acoustic signal encoded according to how a human perceives a 3D sound field as three-dimensional sound, it is possible to reproduce a sound field with a higher sense of reality than before.

This is considered that the effect is similar to the effect in the image that "rather than faithfully reproducing colors, reproducing the "impression" that humans receive as "memory color" makes it more realistic." That is, it is possible to realize a more realistic sound field reproduction.

The acoustic signal encoding method according to the present invention is characterized in that the masking threshold is calculated corresponding to the spatial masking effect based on spatial distance and/or direction between each of channels and/or between each of sound source objects.

With this configuration, for example, using a model calculated based on the spatial distance or direction between each of the channels and/or each of the sound source objects, encoding based on the spatial masking effect becomes possible. That is, when a human listens to sounds scattered in a three-dimensional space, by applying mutual masking effects based on the spatial distance and/or direction of spatially arranged sound sources to encoding, more efficient encoding can be performed, and the data transmission bit rate can be reduced.

The acoustic signal encoding method according to the present invention is characterized in that the masking threshold is calculated corresponding to the spatial masking effect that closer spatial distance and/or direction between the channels and/or the sound source objects, greater influence on each other, and the farther away, smaller influence on each other.

With this configuration, for example, the spatial masking effect can be calculated by a model that the closer the spatial distance or the direction between the channels and/or the sound source objects, the greater the influence on the channels and/or the sound source objects mutually, and the farther away, the smaller the influence. Such spatial masking effect, further enabling efficient encoding, allows transfer of data with reduced bit rate.

The acoustic signal encoding method according to the present invention is characterized in that the masking threshold is calculated corresponding to the spatial masking effect that, for a channel and/or a sound source object front-back symmetrically positioned with respect to a listener, the degree of mutual influence on the spatial distance and/or direction between the sound source objects is changed.

As configured in this way, for the channels or the sound source objects that are front-back symmetrical to the listener, by a model not always in which the closer the spatial distance or the direction between the sound source objects, the greater the effect on each channel or sound source object, and the farther away, the smaller the effect, the spatial masking effect can be calculated. Thereby, for example, it is possible to calculate a large increase in the masking threshold corresponding to the spatial masking effect that the influence becomes stronger as the spatial distance increases at a position front-back symmetrical to the masker.

Such the spatial masking effect enables more efficient encoding and reduces the data transmission bit rate.

The acoustic signal encoding method according to the present invention is characterized in that, the masking threshold is calculated corresponding to the spatial masking effect that, for a channel and/or a sound source object located at a rear position with respect to a listener, the channel and/or the sound object exists in front of front-back symmetrical position.

As configured in this way, for the channels or the sound source objects that are located behind the listener, it is possible to calculate the masking threshold by using the spatial masking effect in which the channel or the object exists in front of the mirror image corresponding to the front-back symmetrical position. That is, the masking threshold is calculated so that the sound source behind the straight line connecting both ears moves to the front of the axis corresponding to the position of line symmetry about the axis.

Such a spatial masking effect enables more efficient encoding and reduces the data transmission bit rate.

The acoustic signal encoding method according to the present invention is characterized in that the masking threshold is calculated corresponding to the spatial masking effect that degree of mutual influence of the signal of each of the channels and/or the sound source object is changed according to whether the signal of each of the channels and/or the sound source object is a tone-like signal or a noise-like signal.

As configured in this way, as the spatial masking effect, the masking threshold can be calculated by a model in which each channel signal or sound source object changes the degree of influence on each channel signal or sound source object signal depending on whether it is a tone-like signal or a noise-like signal.

With such a configuration, more efficient encoding can be performed and the data transmission bit rate can be reduced.

In the acoustic signal encoding method according to the present invention, the masking threshold is adjusted by the following equation (1).

$$T=\beta\{\max(y1,\alpha y2)-1\}$$

$$y1=f(x-\theta)$$

$$y2=f(180-x-\theta) \qquad \text{equation (1)}$$

where T is a weight for multiplying to the masking threshold in the frequency domain of each channel signal in order to calculate the masking threshold, θ is direction of the masker, a is a constant controlled by the frequency of the masker, β is a constant controlled according to whether the masker signal is a tone-like signal or a noise-like signal, and x indicates the direction or direction of the maskee.

With this configuration, the spatial masking effect corresponding to each of the above models can be easily calculated. This enables efficient encoding and reduces the data transmission bit rate.

Typically, it has been common to calculate PE in consideration of only the masking effect in the frequency domain of each channel of the stereo signal.

On the other hand, the acoustic signal encoding method according to the present invention is characterized in that average number of bits per sample is calculated by PE in consideration of the spatial masking effect across channels.

When the bits are assigned to the masking threshold in such a configuration, the data transmission bit rate can be reduced. According to the experiments of the present inventors, it has been confirmed that the bit rate can be reduced by about 5 to 25%.

The acoustic signal decoding method according to the present invention is an acoustic signal decoding method executed by the decoding device 2 characterized in that decodes the acoustic signal of the plurality of channels encoded by the above-mentioned acoustic signal encoding method.

As configured in this way, by decoding the acoustic signal encoded by the encoding device 1 as described above, it is possible to reproduce a high-quality acoustic signal even if the transmission bit rate is low.

OTHER EMBODIMENTS

In addition, in the embodiment of the present invention, 22.2 channel encoding is mentioned as the encoding of the acoustic signal of the plurality of channels.

Regarding this, the acoustic signal encoding method of the present embodiment can also be applied to multi-channel audio coding such as 5.1 channel and 7.1 channel, or the like, 3D sound coding that performs sampling for space, object coding represented by MPEG-H 3D AUDIO, or existing 2-channel stereo sound coding.

That is, the coding device 1 does not need to collect sound by using the microphone array 10 as shown in FIG. 1 of the above-described embodiment, and it is natural that the sound data can be acquired from the multi-channel sound data, the sound object, and the like, which have already been collected in step S101 of FIG. 2.

Further, in the above-described embodiment, an example where the acoustic system X uses headphones capable of head tracking as the decoding device 2 for decoding the transmitted acoustic signal has been described. However, in the acoustic signal encoding method and the acoustic decoding method according to the present embodiment, any acoustic system capable to use the masking effect in auditory perception that acts on sound sources scattered in three-dimensional space can be applied. For example, it can also be applied to the other 3D sound field capture, transmission, reproduction system, VR/AR application, or the like.

Explaining with specific examples, in the above-described embodiment, an example in which a wearable headphone, earphone, or the like, is used as the headphone 110 for reproducing three-dimensional sound has been described.

However, as shown in the Example, the headphone 110 may naturally be substituted for a plurality of stationary speakers, or the like.

Further, in the above-described embodiment, although it is described that the positional direction information is fed back from the headphones to the encoding device 1, it is not necessary to do so. In this way, when the positional direction information is not fed back, of course, it is also possible to calculate the masking threshold without using the position direction information.

In this case, the three-dimensional sound reproduction unit 100 does not have to update the convolution of the head-related transfer function (HRTF) according to the position direction information.

In addition, in the above-described embodiment, the configuration in which the decoding device 2 includes the direction calculation unit 70 and the transmission unit 80 has been described.

However, in the acoustic signal encoding method and the acoustic decoding method according to the present embodiment, it does not necessarily require that the direction in which the listener is facing is to be known. Therefore, a configuration that does not include the direction calculation unit 70 and the transmission unit 80 is also possible.

In the above-described embodiment, an example of calculating the spatial masking effect by extending the frequency masking has been described.

On the other hand, it is possible to calculate the same spatial masking effect by substituting the frequency for time. Further, as a spatial masking effect, it is also possible to use a combination of masking between frequencies and directions and masking between times and directions.

Further, in the above-described embodiment, an example of transmission while keeping the bit rate low due to the spatial masking effect has been described. That is, an example of encoding the acoustic signal of a plurality of channels with the same quality as the typical high bit rate acoustic encoding has been described.

On the other hand, it is possible not only to perform high-quality encoding but also to perform encoding by emphasizing important sounds or deforming the sense of localization. Otherwise, with the spatial masking effect, the amount of information allocated to important part in auditory perception can be increased; on the contrary, the amount of information allocated to part that are not important in auditory perception can further be reduced; and by doing so, it is possible to emphasize the sense of presence.

In addition, in the above-described embodiment, an example of performing bit allocation as the allocation of the amount of information has been described.

However, the allocation of the amount of information may be the allocation of the amount of information corresponding to entropy encoding or other encoding, instead of simply determining (allocating) the number of bits for each frequency band.

Further, as described in the above embodiment, when there is feedback of the position direction information, by using the position direction information, it is possible to calculate the masking threshold, efficiently.

Therefore, it is possible to configure the distribution (transmission) bit rate to be changed depending on the presence or absence of feedback of the position direction information. That is, the decoding device 2 that feeds back the position direction information to the encoding device 1 allows transmission of data at a lower bit rate than the decoding device 2 that does not feed back the position direction information.

With this configuration, it is possible to achieve a service that provides content at a lower cost.

Next, the present invention is further described by Example based on the drawings, but the following specific example do not limit the present invention.

EXAMPLE

Experiment of Masking Model Considering Spatial Masking

Experimental Method

Figure 5:
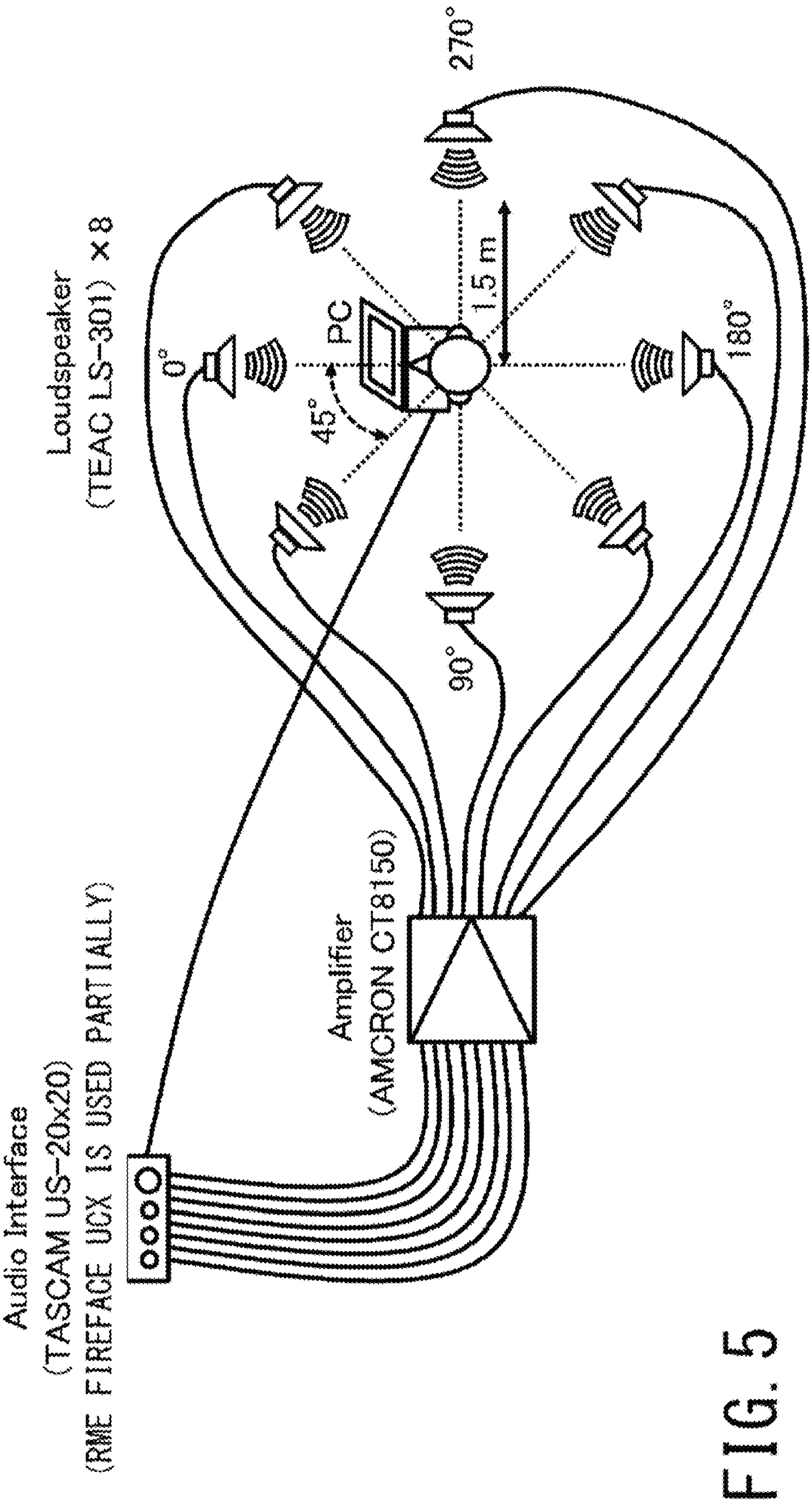
FIG. 5 is a conceptual diagram showing a measurement system for a listening experiment according to an example of the present invention.
Figure 6:
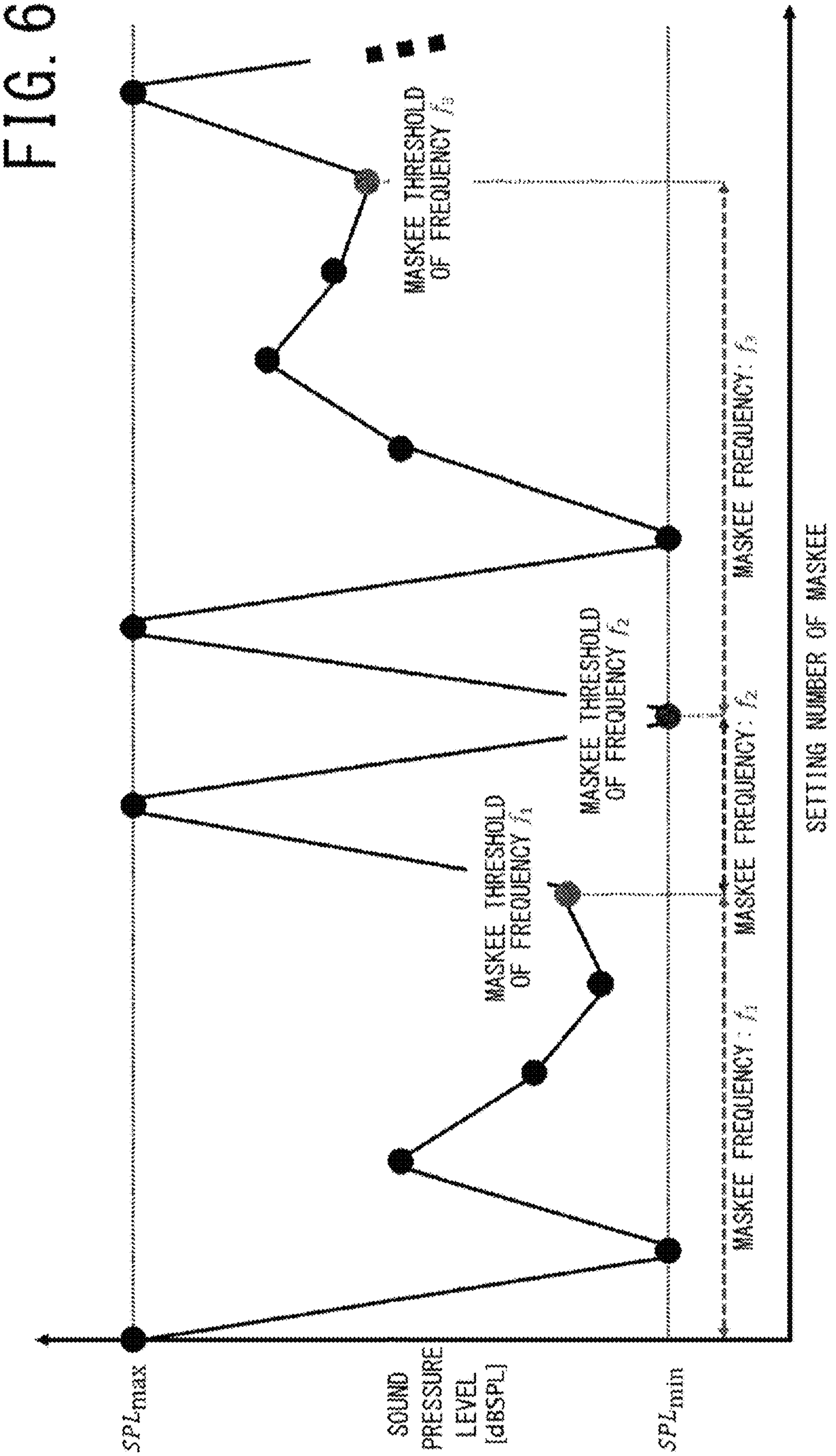
FIG. 6 is a conceptual diagram showing a threshold search in the listening experiment according to the example of the present invention.

As refer to FIG. 5 and FIG. 6, an experiment, which the threshold value at each frequency of the maskee in the presence of the masker is measured for each direction of the maskee, is explained.

FIG. 5 is a configuration diagram showing a measurement system. Here, the front of the subject is 0 degree, and the counterclockwise direction is positive. Then, a PC (Personal Computer) is placed in front of the subject. The subject sits in a chair and listens to the stimulating sound presented by the speaker with both ears. The speakers are placed at eight locations at 45 degree intervals so as to surround the entire circumference around the subject at a position 1.5 m away from the subject. In addition, the sound pressure level [dBSPL] at the output of the experimental system was calibrated by measuring with a sound level meter (RION NA-27).

The experimental method is described below. At first, in order for the subject to understand the sound sources used in the experiment, a demonstration is conducted in which each sound source is presented, individually. Next, the measurement is started. The masker is always presented during the measurement. The maskee is presented with a duration of 0.7 seconds, and the presentation is repeated after 0.7 seconds of silence. While looking at answer screen, the subject inputs "whether or not there is feeling a change in the masker sound" to the PC while the maskee is presented three times for each frequency and each sound pressure level of the maskee. At this time, the subject is instructed to input answer by moving only the line of sight without moving the head. Here, "feeling a change in the masker sound" includes not only the case where the maskee is perceived but also the case where the sound that is neither the masker nor the maskee is perceived. For example, when two pure tones with slightly different frequencies are presented at the same time, there is a "hum" in which a sound having a frequency equal to the difference between the frequencies of the two sounds is perceived due to the interference of sound waves. The case where such a sound is perceived is also included in case of "feeling a change in the masker."

In addition, in order to get used to the experimental method, test measurements that were not reflected in the experimental results were first performed several times.

FIG. 6 shows an explanatory diagram of the threshold value search method in this experiment. The threshold value search method in this experiment is performed according to the adaptive method. The adaptive method is a method in which the experimenter adjusts the physical parameter value of the stimulus according to the response of the subject to determine the threshold value.

In FIG. 6, the horizontal axis represents the number of maskee sets, and the vertical axis represents the maskee sound pressure level. "1 set" of the number of maskee sets refers to the period during where the maskee is presented three times, and this is used as the unit for presenting the sound source.

Firstly, the maskee frequency is fixed at f1 and presented to the listener at the sound pressure level "SPLmax". Subsequently, the sound pressure level is changed to "SPLmin" and presented to the listener. "SPLmax" refers to the maximum value in the sound pressure level measurement range, and "SPLmin" refers to the minimum value in the sound pressure level measurement range. Here, if the subject cannot detect the maskee at the sound pressure level "SPLmax", the "SPLmax" is regarded as the threshold value, and if the maskee at the sound pressure level "SPLmin" can be detected, the SPLmin is regarded as the threshold value. At this time, it is considered that the actual threshold value exists outside the measurement range. An example considered as described above is the maskee threshold of frequency f2 in FIG. 6. In FIG. 6, the maskee at frequency f2 is not detected even at the sound pressure level "SPLmin" is shown. Thus, the number of sets of sound pressure levels that a subject must respond to depends on the subject's response. After the maskee is presented at the sound pressure level SPLmin, the threshold is explored as for binary searching according to the subject's response. That is, a value that is center of the minimum value of the maskee sound pressure level that can be detected by the measurement so far and the maximum value of the maskee sound pressure level that cannot be detected so far is set as the value of the next sound pressure level. If such a search is continued, only one sound pressure level that can be finally set remains. The final remaining sound pressure level is used as the threshold value of the maskee having a frequency of f1.

The above search is investigated by continuously changing the frequencies in the order of f1, f2, f3, . . . , as shown in FIG. 6. In this experiment, the maskee thresholds are investigated in order from the low frequency side.

Figure 7A:
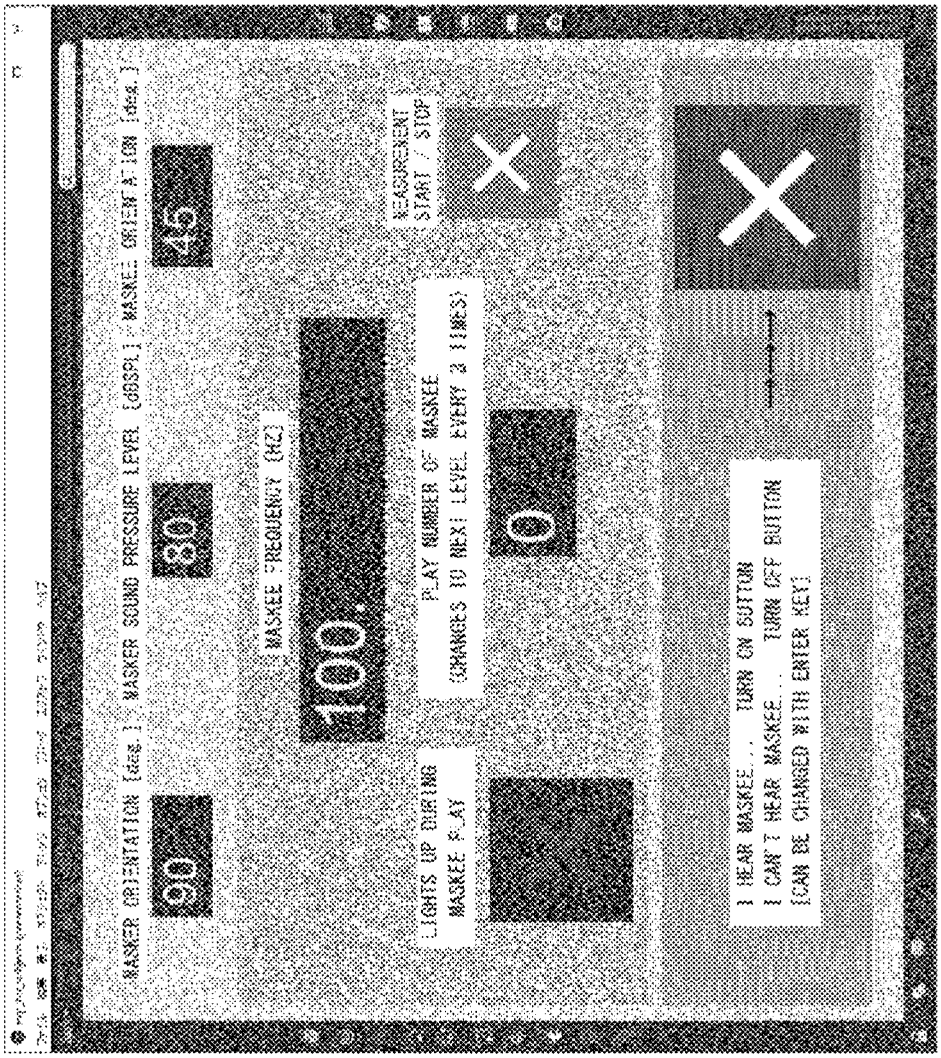
FIG. 7 is a screen example of an answer screen in the listening experiment according to the example of the present invention.
Figure 7B:
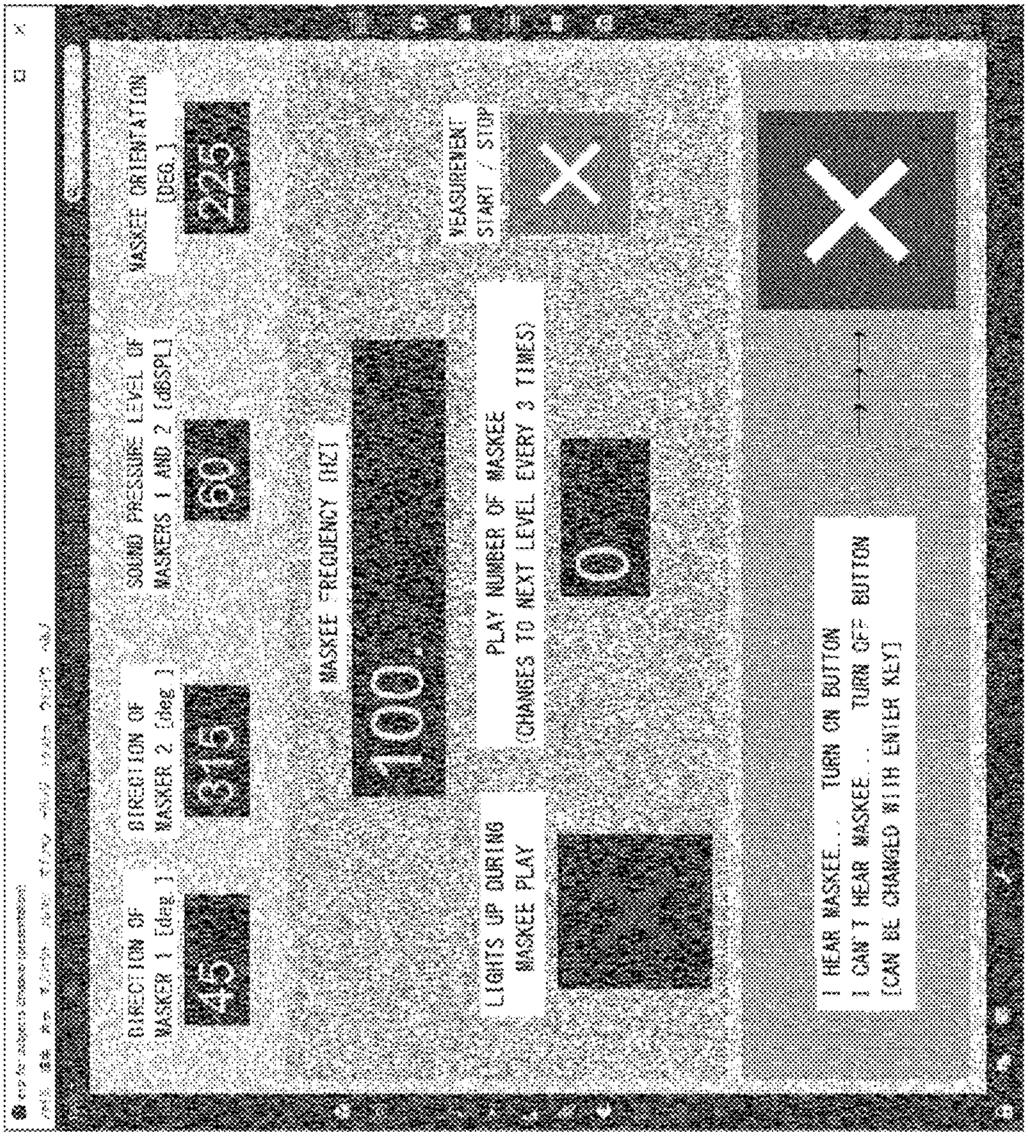
Figure 8:
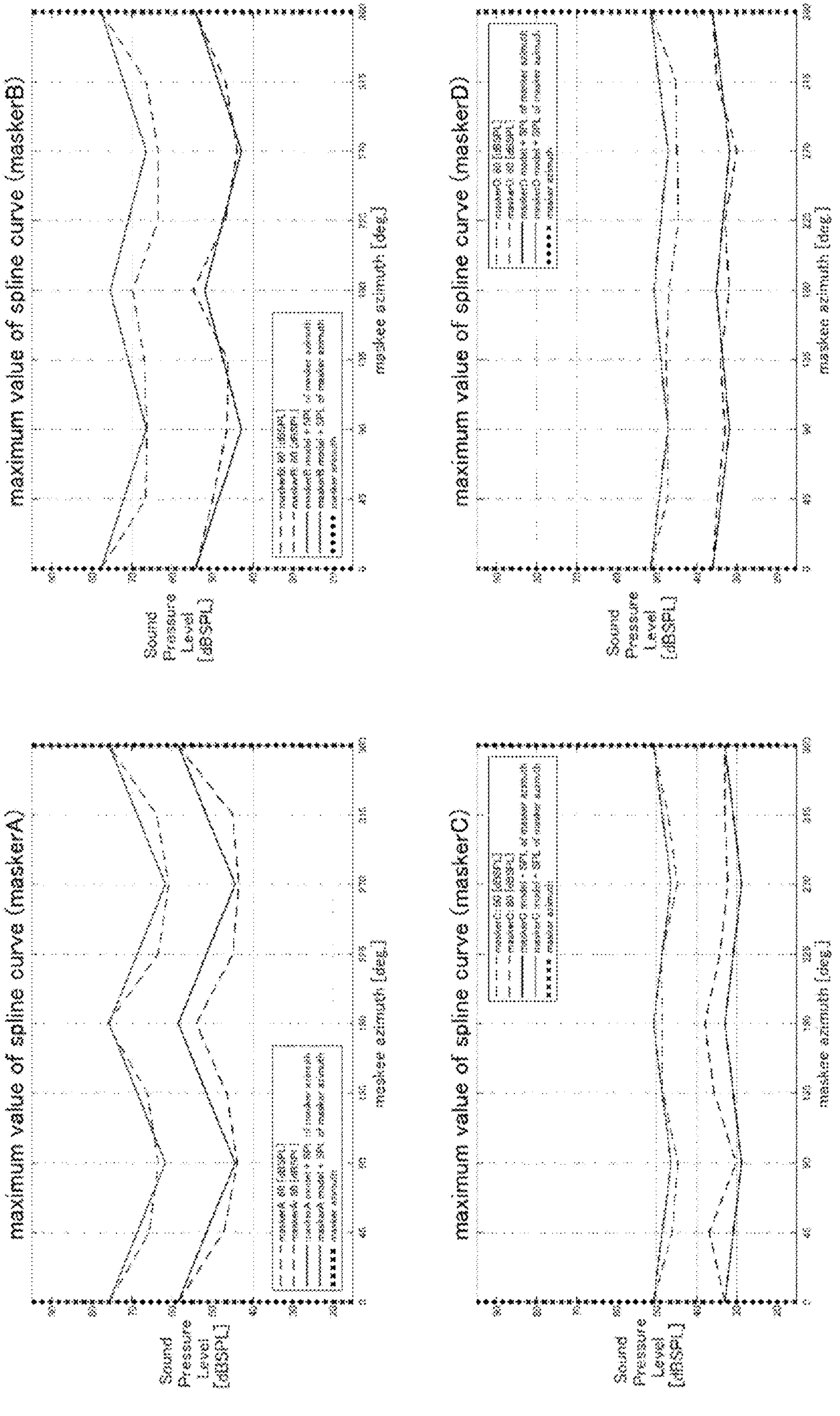
FIG. 8 is a graph in which the peak values of the masking threshold when the orientation of the masker is 0 degree are plotted with the horizontal axis as the orientation of maskee according to the example of the present invention.
Figure 9:
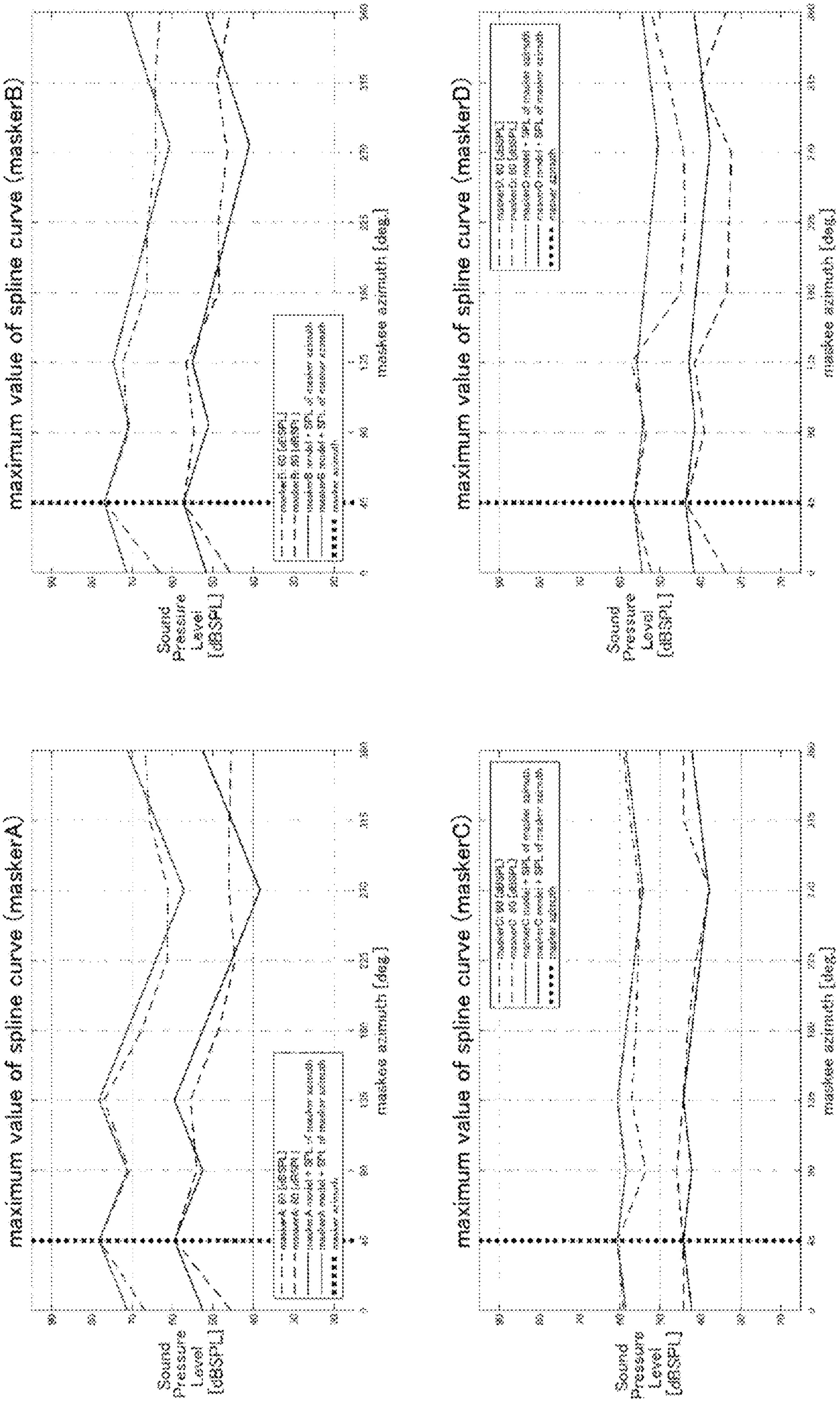
FIG. 9 is a graph in which the peak values of the masking threshold when the orientation of the masker is 45 degree are plotted with the horizontal axis as the orientation of maskee according to the example of the present invention.
Figure 10:
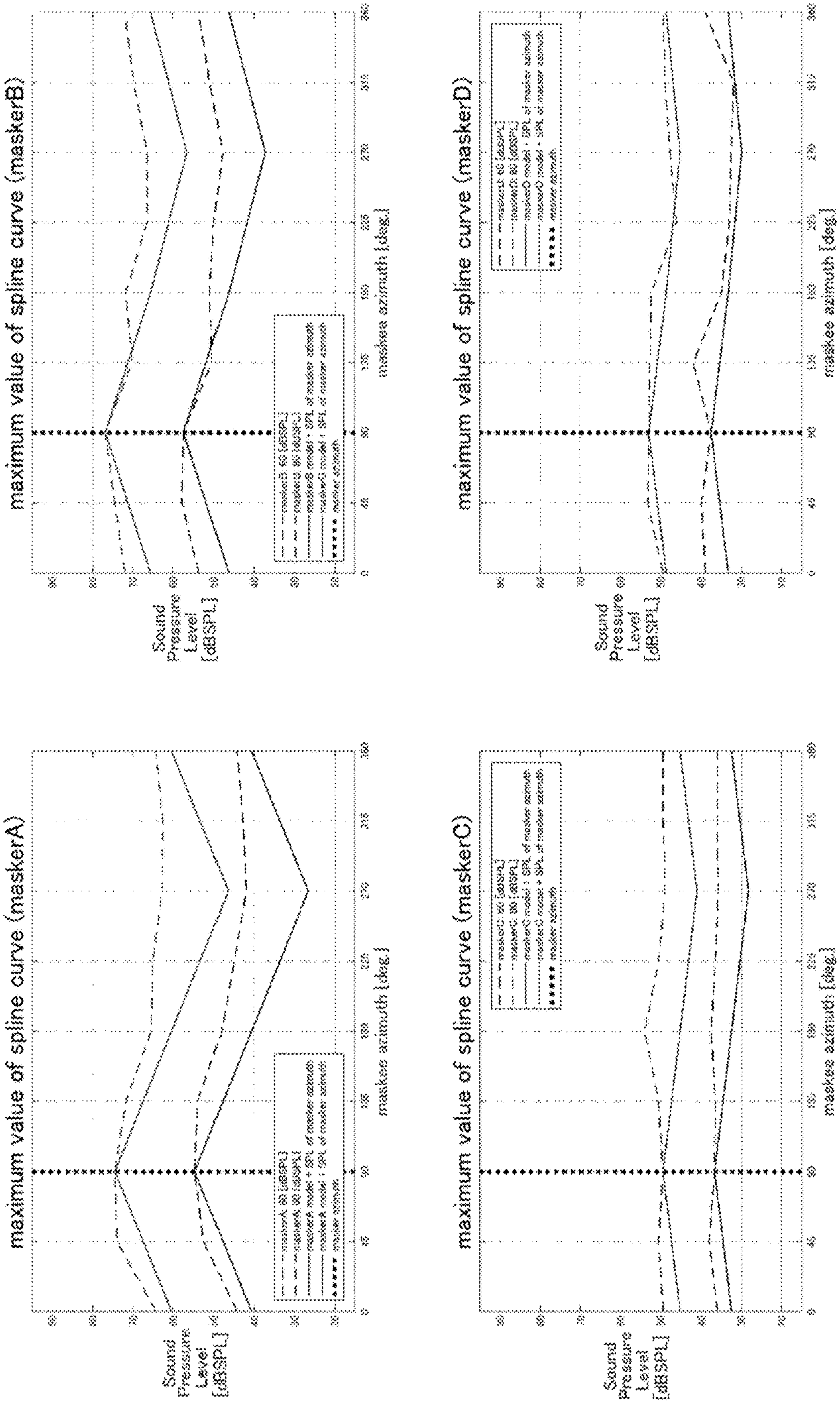
FIG. 10 is a graph in which the peak values of the masking threshold when the orientation of the masker is 90 degree are plotted with the horizontal axis as the orientation of maskee according to the example of the present invention.
Figure 11:
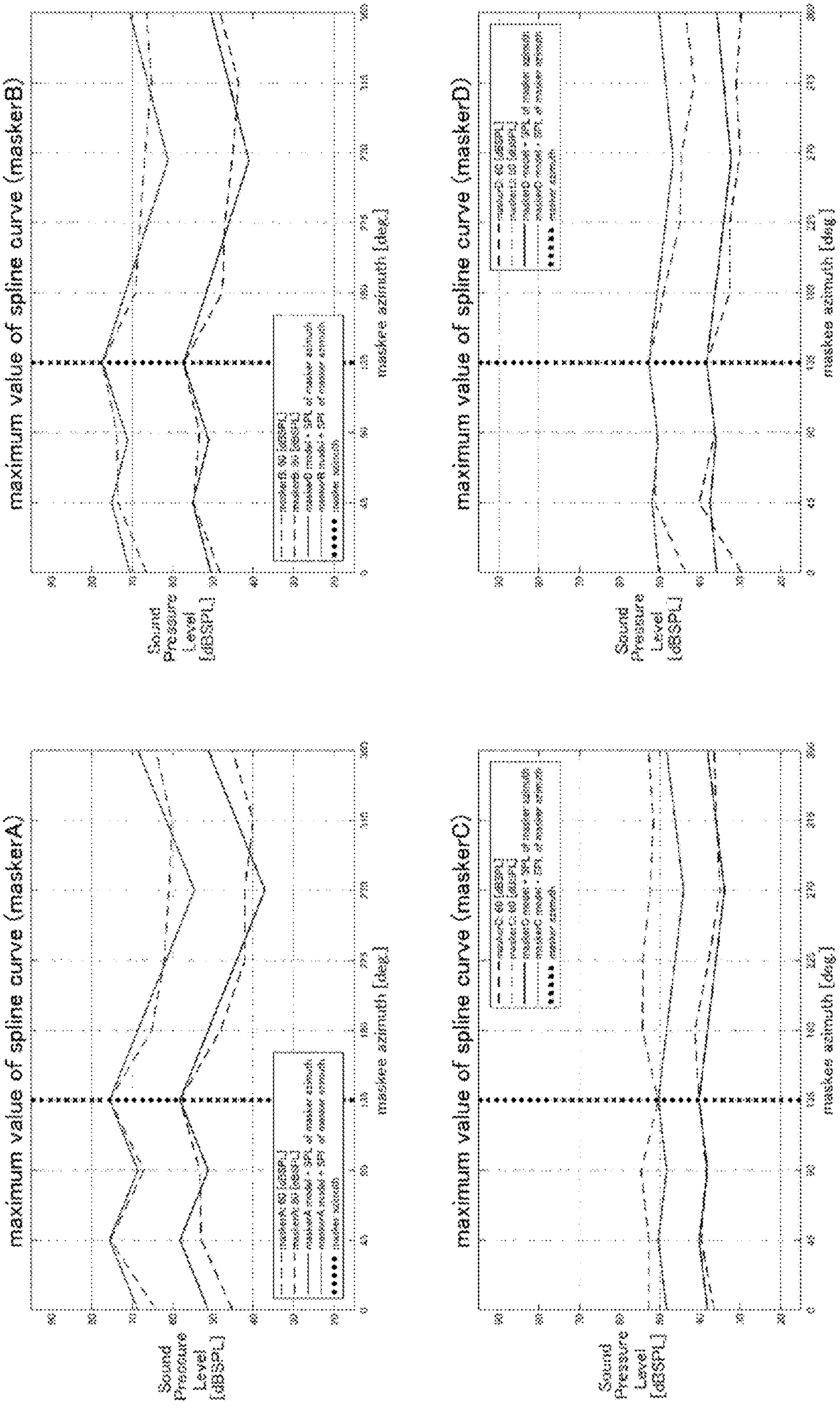
FIG. 11 is a graph in which the peak values of the masking threshold when the orientation of the masker is 135 degree are plotted with the horizontal axis as the orientation of maskee according to the example of the present invention.

FIG. 7 shows an answer screen presented to the subject. The answer screen when the masker is one sound source is FIG. 7A, and answer screen when the masker is two sound sources is FIG. 7B. On the screen, the direction of the masker, the sound pressure level of the masker, the direction of the maskee, the frequency of the maskee, the lamp that lights up during the playback of the maskee, the counter indicating the number of times the maskee has been played, and the button for inputting whether or not the maskee is detected are displayed, respectively. The subject can perceive when each sound source is presented in what direction and in what volume. The reason for displaying the frequency of maskee, since the measurement is intended to investigate while continuously changing the frequency (the type of the masker) of the masker, this is to clarify which maskee the subject is currently entering the answer and to prevent confusion in the answer. The subject himself or herself informs the PC that "maskee is detected" by turning on the button for inputting whether or not maskee is detected, and the subject informs the PC that "maskee cannot be detected" by turning off the button, In addition, the initial value of the counter indicating the number of times the maskee is played is "0", and it changes to 0, 1, 2, 3, 0, or the like, according to the number of times the maskee is played. When "0" is counted, answer is reset, that is, the button for inputting whether or not maskee is detected is turned off, and maskee moves to the next sound pressure level or the frequency. The subject must enter the presence or absence of detection while this counter is displaying 1, 2, and 3.

In addition, the answer program for the listening experiment is coded by Max ver. 7 produced by Cycling '74 corp. The other programs are coded by MATLAB ver. R2018a produced by MathWorks inc.

List of Maskers

A list of the maskers used in the experiment is shown in Table 1 below.

TABLE 1

| USING MASKER | |
|---|---|
| NAME | SOUND SOURCE SIGNAL |
| MASKER A | BAND NOISE WITH CENTER FREQUENCY OF 400 Hz, BANDWIDTH OF 100 Hz |
| MASKER B | BAND NOISE WITH CENTER FREQUENCY OF 1000 Hz, BANDWIDTH OF 150 Hz |
| MASKER C | PURE TONE WITH FREQUENCY OF 400 HZ |
| MASKER D | PURE TONE WITH FREQUENCY OF 1000 HZ |

For the masker, band noise and pure tone having a frequency (center frequency) of 400 Hz or 1000 Hz has been prepared. Hereinafter, these maskers were described by names from masker A to masker D. The bandwidth of the band noise was determined so as to roughly match the bandwidth of the critical band. It is known that the noise component that contributes to the mask of a certain pure tone is limited to the component of a certain bandwidth in the band noise having the pure tone as the center frequency. The critical band is a band that contributes to such a pure tone mask.

Experimental Conditions

As the experimental conditions, two types of the experiments were performed, one was a case that the number of maskers was one and the other was a case that the number of maskers was two. The experiments were conducted in an anechoic chamber, and the sampling frequency of the sound source signal was set to 48 kHz.

Firstly, Table 2 below shows the condition when the number of maskers to be arranged is one.

TABLE 2

| EXPERIMENTAL CONDITIONS (WHEN USING MASKER AS ONE SOUND SOURCE) | |
|---|---|
| EXPERIMENT PLACE<br>SUBJECTS | ANECHOIC ROOM<br>TWO SUBJECTS<br>(SUBJECT A, SUBJECT B) |
| SAMPLING FREQUENCY [kHz] | 48 |
| NUMBER OF MASKERS TO PLACE | 1 |
| MASKER TO PLACE | MASKER A OR MASKER B OR MASKER C OR MASKER D |
| MASKER SOUND PRESSURE LEVEL dDBSPL] | 60 OR 80 |
| MASKER DIRECTION [deg.] | 0 OR 45 OR 90 OR 135 |
| NUMBER OF MASKEE TO PLACE | 1 |
| MASKEE TO PLACE | PURE TONE |
| MASKEE FREQUENCY [Hz] | WHEN MASKER FREQUENCY OR CENTER FREQUENCY IS 400 Hz:<br>100 200 300 340 370 390 397<br>403 410 430 460 500 600 700<br>797 803 900 1000 1197 1203<br>1400 1597 2000 2400 2800<br>3200 4000 5000 6000<br>WHEN MASKER FREQUENCY OR CENTER FREQUENCY IS 1000 Hz:<br>100 200 300 400 500 600 700<br>800 900 940 970 990 997 1003<br>1010 1030 1060 1100 1200<br>1400 1600 1997 2003 2400<br>2800 3200 3997 5000 6000 |
| MASKEE SOUND PRESSURE LEVEL [dBSPL] | WHEN THE SOUND PRESSURE LEVEL OF MASKER IS 60 dBSPL:<br>18 21 24 27 30 33 36 39<br>42 45 48 51 54 57 60<br>WHEN THE SOUND PRESSURE LEVEL OF MASKER IS 80 dBSPL:<br>20 23 26 29 32 35 38 41<br>44 47 50 53 56 59 62 65<br>68 71 74 77 80 |
| MASKEE ORIENTATION [deg.] | 0 OR 45 OR 90 OR 135 OR<br>180 OR 225 OR 270 OR 315 |

The subjects were two males in their twenties (subject a and subject b) who had normal hearing. As the masker, any one of the above-mentioned sound sources from masker A to masker D was used. Two types of sound pressure levels, 60 dBSPL and 80 dBSPL, were used for the masker. The orientation of the masker was one of four orientations of 0 degree, 45 degree, 90 degree, and 135 degree. That is, the orientations of the maskers were only the four orientations on the left ear side. When the experiment is performed by preparing four directions of the masker as described above, the threshold data for half of the circumference of the subject can be obtained. Assuming that the human head shape is symmetrical, the threshold is considered to be symmetrical on the midline, so the threshold data for the remaining half of the circumference, which cannot be obtained in this experiment, is symmetrical to the data obtained in this experiment.

The maskee uses one pure tone sound source, and its frequency and sound pressure level are as follows. Specifically, the maskee frequency was determined to be dense at frequencies close to the masker frequency (center frequency). In addition, when the masker is a pure tone, when the frequency of the maskee completely matches the frequency of the masker (400 Hz, 1000 Hz), it is considered that the maskee cannot be perceived at any sound pressure level, so such frequencies were excluded from the measurement. The possible value of the maskee sound pressure level was set to every 3 dB, the maximum level was the masker sound pressure level, and the minimum level was 20 dBSPL or 18 dBSPL. The maximum level was determined with the expectation that the maskee could be completely perceived when the maskee sound pressure level was greater than the masker sound pressure level. The minimum level was determined so that the measurement range was approximately 15 dB smaller than the background noise level in consideration of the background noise level in anechoic room where the experiment was conducted. The orientation of the maskee was 45 degree or 315 degree. When the maskee direction is 45 degree, the directions of the masker and the maskee match, and as a result, the threshold value of frequency masking that has been typically studied is obtained. On the other hand, when the maskee orientation is 315 degree, the masker and the maskee are present in different orientations, resulting in a threshold for masking between stereo channels, that is, spatial masking.

The direction of the maskee was chosen one of eight directions from 0 degree to 315 degree for every 45 degree.

Next, the conditions when the number of maskers to be arranged is two are shown in Table 3 below.

TABLE 3

EXPERIMENTAL CONDITIONS (WHEN USING TWO SOUND SOURCES FOR MASKERS)

| EXPERIMENT PLACE | ANECHOIC ROOM |
|---|---|
| SUBJECTS | 1 SUBJECT (SUBJECT A) |
| SAMPLING FREQUENCY [kHz] | 48 |
| MASKER TO BE PLACED | MASKER A AND MASKER B |
| NUMBER OF MASKERS TO PLACE | 2 |
| MASKER SOUND PRESSURE LEVEL [dBSPL] | 60 OR 80 |
| MASKER DIRECTION [deg.] | MASKER A: 45, MASKER B: 315 |
| NUMBER OF MASKEE TO PLACE | 1 |
| MASKEE TO PLACE | PURE TONE |
| MASKEE FREQUENCY [Hz] | 100 200 300 340 370 390 397 400 403 410 430 460 500 600 700 797 800 803 900 940 970 990 997 1000 1003 1010 1030 1060 1100 1197 1200 1203 1400 1597 1600 1997 2000 2003 2400 2800 3200 3997 4000 5000 6000 |
| MASKEE SOUND PRESSURE LEVEL [dBSPL] | WHEN SOUND PRESSURE LEVEL OF MASKER IS 60 dBSPL: 18 21 24 27 30 33 36 39 42 45 48 51 54 57 60 63 66 69 WHEN SOUND PRESSURE LEVEL OF MASKER IS 80 dBSPL: 20 23 26 29 32 35 38 41 44 47 50 53 56 59 62 65 68 71 74 77 80 83 86 89 |
| MASKEE ORIENTATION [deg.] | 225 |

The subject is only subject a. As for the masker, the masker A was arranged at an orientation of 45 degree and the masker B was arranged at an orientation of 315 degree. The maskee used is one pure tone sound source. As the maskee frequency, a combination of the conditions when the masker frequency (center frequency) was 400 Hz and the conditions when the masker frequency (center frequency) was 1000 Hz was used. Since the maskers (masker A and masker B) to be arranged are all band noises, even when the frequency of the maskee completely matches the center frequency of the masker (400 Hz, 1000 Hz), unlike pure tones, it is thought that maskee can be perceived equal or greater than a certain sound pressure level. Therefore, 400 Hz and 1000 Hz were also added to the measurement target. Further, the maximum sound pressure level of maskee was 9 dB higher than that in Table 2. This is done in consideration of the sound pressure level of the sound to be heard rising by about 6 dB at the maximum due to the existence of two maskers.

The orientation of the maskee was 225 degree.

Calculation of Masking Threshold

Experimental Results and Discussion

The experimental results regarding the subject a is described with reference to FIGS. 8 to 11.

The α and β described in the above equation (5) were searched within the range of the values as shown in the following Table 4.

TABLE 4

EXHAUSTIVE COMPUTATION RANGE α AND β

| PARAMETER | EXHAUSTIVE COMPUTATION RANGE |
|---|---|
| α | 0, 0.01, 0.02, . . . , 1 |
| β | 0, 0.01, 0.02, . . . , 20 |

In this example, the optimum values of α and β were calculated as follows. Firstly, the mean squared error (MSE) between $T_{spatial}$ at a certain α, β value and the maximum threshold value in each direction of the maskee obtained as an experimental result is calculated for all combinations of masker type (masker A to masker D), direction, and sound pressure level. Next, the calculated mean square error is summed for each type of masker. The above operation by changing the values of α and β is repeated, and the set of α and β when the sum of the mean square errors for each type of masker is minimized is taken as the optimum value of α and β.

Here, the mean square error MSE (j) in the direction of the j-th masker is calculated by the following equation (6).

[Number 4]

EQUATION (6)

$$MSE(j)=\frac{1}{N}\sum_{i=1}^{N}\{(T_{spatial}(i)+L_{masker\_azimuth})-T_{measured}(i)\}^2$$

Here, in equation (6), $T_{spatial}(i)$ represents the output value of the function $T_{spatial}$ in the i-th maskee direction [deg.]., and $T_{measured}(i)$ represents a measured value obtained by an experiment of the maskee threshold value in the i-th maskee direction [deg.]. $L_{masker\ azimuth}$ represents the maskee threshold [dBSPL] in the direction in which the masker is present. This has the role of adjusting the offset between $T_{spatial}$ and $T_{measured}$, as $T_{spatial}$ represents the amount of threshold attenuation from the direction in which the masker is present. N is the number of entries for $T_{spatial}$ and $T_{measured}$ (total number of maskee orientations). In this calculation, the maskee directional step is set to 1 degree step from 0 degree to 360 degree, so N=361. However, in $T_{measured}$, the maskee's azimuth step is 45 degree step as the measured value, so the value was estimated by performing linear interpolation for the missing part when it was set to 1 degree step.

As a result of all the calculations, the optimum values of α and β were obtained for maskers A to D as shown in Table 5 below.

TABLE 5

OPTIMAL VALUES OF α AND β OBTAINED BY EXHAUSTIVE COMPUTATIONS

| MASKER TYPE | OPTIMAL VALUE OF α | OPTIMAL VALUE OF β |
|---|---|---|
| MASKER A | 0.40 | 11.96 |
| MASKER B | 0.28 | 9.24 |
| MASKER C | 0.52 | 1.12 |
| MASKER D | 0.30 | 5.82 |

FIGS. 8 to 11 show $T_{spatial}$ fitted to the measured value of the maskee threshold value by using the values in Table 5, respectively. The upper left graph of each figure is the result for masker A, the upper right graph is the result for masker B, the lower left graph is the result for masker C, and the lower right graph is the result for masker D.

The horizontal axis of each graph is the maskee direction, and the vertical axis is the sound pressure level. The direction corresponding to the direction of the masker is indicated by a vertical dotted line. The solid black line represents the measured value of the maskee threshold when the sound pressure level of the masker is 80 dBSPL, and the solid gray line represents the measured value of the maskee threshold when the sound pressure level of the masker is 60 dBSPL. On the other hand, the red dashed line represents the one fitted to the red solid line by using the function $T_{spatial}$, and the gray dashed line represents the one fitted to the gray solid line using the function $T_{spatial}$.

In addition, each broken line is the output of the function $T_{spatial}$ with the offset $L_{masker\ azimuth}$ added.

According to FIGS. 8 to 11, it can be seen that each graph generally fits the measured value. However, as shown in the upper left graph of FIG. 8 and the upper left graph of FIG. 9, for maskers in the case of band noise such as masker A and masker B, regarding the rise of the threshold value in the front-back symmetrical direction, there are parts where the broken line does not fit the solid line as well. The reason is conceivable that when the masker is band noise and the masker orientation is 90 degree, the change due to the threshold direction is relatively small, thus it affects when trying to minimize the sum of mean square errors, and this is because it worked to reduce the value of α. In order to fit the above part well, if the error between the measured value when the masker orientation is 90 degree and the model function is allowed to be large, the value of a may be set larger.

Further, in this embodiment, the values of α and β were obtained by exhaustive computations, but the value of β can be determined based on an indicator for discriminating the tonality (tone-like property, noise-like property) of the masker. Examples of an indicator for determining the tonality of a masker include autocorrelation and Spectral Flatness Measure (SFM). By using these indicators, it is possible to determine β parametrically and fit it.

SUMMARY

In this example, it is possible to perform a basic listening experiment to confirm spatial masking, and it become possible to perform masking threshold calculation methods and modeling that take spatial masking into consideration by reflecting the findings obtained from the experiment.

Firstly, in the listening experiment, the existence of spatial masking was confirmed because the threshold value increased near the frequency of the masker even when the masker and the maskee were present in different directions.

The masking threshold changes depending on the direction of the masker and the direction of the maskee. Basically, the threshold decreases as the direction of the maskee moves away from the direction of the masker. For a two-channel stereo environment, the masking threshold value of the signal of the own channel effecting on the own channel plus a weight of 15 dB may be used as the masking threshold effecting the signal of the own channel on the signal of the other channel. Regarding all directions, when the masker is band noise, the maskee is at the front-back symmetrical direction of the masker with respect to the frontal plane of the listener, the masking threshold is higher than the other directions, which is more remarkable as the center frequency of the masker is lower. Further, when the masker is a pure tone, the change of the threshold value depending on the orientation of the maskee is flat.

Furthermore, when each masker exists independently, by adding up the masking threshold at the signal in the same direction as the masker and the masking thresholds at the signal in other directions in a linear scale, it may be used as a masking threshold in consideration of signals in other directions.

The following is a summary of these results:

When the masker is 0 degree, the one with the maskee position of 0 degree has the highest threshold. The threshold decreased as the maskee position moved away from the masker, as like at 45 degree and 90 degree. However, it started to rise at 135 degree, and at 180 degree, the threshold increased to almost the same level as at 0 degree. That is, the masking threshold by the masker had a substantially symmetrical relationship in front and back of the listener.

When the masker was 45 degree, the threshold was highest when the maskee position was 45 degree. At 90 degree, the threshold dropped. It was thought that it would drop further at 135 degree, but unexpectedly, the threshold increased and approached the threshold at 45 degree. At 180 degree, the threshold decreased, and at 225 degree, it decreased further. This is the same as when the masker is 0 degree, and the masking threshold is in a substantially symmetrical relationship in front and back of the listener. That is, it was line symmetric with respect to the line connecting 90 degree to 270 degree.

The same tendency was observed when the masker was 90 degree and the masker was 135 degree.

Based on the above findings, we proposed a masking threshold calculation method that considers spatial masking as follows: In a two-channel stereo environment, the masking threshold of one's own channel and the masking threshold of the other channel weighted by −15 dB are summed in a linear scale. For all directions, by using an arbitrary periodic function with a period of 360 degree and a phase shifted version of the periodic function so that it is line-symmetrical at 90 degree and 270 degree, the change in the peak of the masking threshold depending on the direction is used to make the model. By using the modeled function, the masking thresholds of each channel are weighted and then summed in a linear scale.

That is, the masking threshold can be calculated by the above equation (1). By calculating the masking threshold based on this, the number of bits required for signal transmission can be reduced.

Needless to say, the configuration and operation of the above-described embodiment are examples, and can be appropriately modified and executed without departing from the aim of the present invention.

INDUSTRIAL APPLICABILITY

By utilizing the spatial masking effect of hearing, the biological signal sequence analysis method of the present invention can provide an acoustic signal encoding method having a lower bit rate than the typical method, and it can be used industrially.

EXPLANATION OF SYMBOLS

1 Encoding device
2 Decoding device
10 Microphone array
20 Sound collector
30 Frequency domain conversion unit

40 Masking threshold calculation unit
50 Information amount determination unit
60 Encoding unit
70 Direction calculation unit
80 Transmission unit unit
90 Decoding unit
100 Three-dimensional sound reproduction unit
110 Headphone
X Sound system

The invention claimed is:

1. An acoustic signal encoding method that encodes an acoustic signal of a plurality of channels and/or a plurality of sound source objects and that is executed by an encoding device, comprising the steps of:

calculating a masking threshold corresponding to a spatial masking effect of hearing;

determining an amount of information to be allocated to each of the plurality of channels and/or the plurailty of sound source objects by calculated masking threshold;

encoding the acoustic signal of the plurality of channels and/or the plurality of sound source objects by each of the allocated amount of information, wherein the masking threshold is calculated corresponding to the spatial masking effect of hearing based on a spatial distance and/or direction between each of the plurality of channels and/or between each of the plurality of sound source objects, wherein the masking threshold is calculated corresponding to the spatial masking effect of hearing such that, for each of the plurality of channels and/or each of the plurality of sound source objects located at front-back symmetrical position with respect to a listener, a degree of mutual influence on the spatial distance and/or direction between each of the plurality of channels and/or each of the plurality of sound source objects is changed; wherein the masking threshold is calculated corresponding to the spatial masking effect of hearing such that, for a channel and/or sound source object behind the listener, a second channel and/or second sound source object is considered to exist, wherein the second channel and/or second sound source object considered to exist is the same as the channel and/or the sound source object behind the listener except that the second channel and/or the second sound source object is considered to be in front of the listener corresponding to a front-back symmetrical position relative to the channel and/or the sound source object behind the listener.

2. The acoustic signal encoding method according to claim 1, wherein the masking threshold is calculated corresponding to the spatial masking effect of hearing such that a degree of mutual influence of the signal of each of the plurality of channels and/or the plurality of sound source objects is changed according to whether the signal of each of the plurality of channels and/or the plurality of sound source objects is a tone-like signal or a noise-like signal.

3. The acoustic signal encoding method according to claim 2, wherein the masking threshold is adjusted by following equation (1)

$$T=\beta\{\max(y1,\alpha y2)-1\}$$

$$y1=f(x-\theta)$$

$$y2=f(180-x-\theta) \quad \text{equation (1)}$$

where T is a weight for multiplying to the masking threshold in the frequency domain of each channel signal in order to calculate the masking threshold, θ is direction of the masker, α is a constant controlled by the frequency of a masker, β is a constant controlled according to whether a masker signal is a tone-like signal or a noise-like signal, and x indicates the direction or direction of a maskee.

4. An acoustic signal decoding method performed by a decoding device, comprising the step of:

decoding the acoustic signal of the plurality of channels encoded by the acoustic signal encoding method according to claim 3.

5. The acoustic signal encoding method according to claim 1, wherein the masking threshold is calculated corresponding to the spatial masking effect of hearing such that a degree of mutual influence of the signal of each of the plurality of channels and/or the plurality of sound source objects is changed according to whether the signal of each of the plurality of channels and/or the plurality of sound source objects is a tone-like signal or a noise-like signal.

6. The acoustic signal encoding method according to claim 5, wherein the masking threshold is adjusted by following equation (1)

$$T=\beta\{\max(y1,\alpha y2)-1\}$$

$$y1=f(x-\theta)$$

$$y2=f(180-x-\theta) \quad \text{equation (1)}$$

where T is a weight for multiplying to the masking threshold in the frequency domain of each channel signal in order to calculate the masking threshold, θ is direction of the masker, α is a constant controlled by the frequency of a masker, β is a constant controlled according to whether a masker signal is a tone-like signal or a noise-like signal, and x indicates the direction or direction of a maskee.

7. An acoustic signal decoding method performed by a decoding device, comprising the step of:

decoding the acoustic signal of the plurality of channels encoded by the acoustic signal encoding method according to claim 6.

8. An acoustic signal decoding method performed by a decoding device, comprising the step of:

decoding the acoustic signal of the plurality of channels encoded by the acoustic signal encoding method according to claim 5.

9. An acoustic signal decoding method performed by a decoding device, comprising the step of:

decoding the acoustic signal of the plurality of channels encoded by the acoustic signal encoding method according to claim 1.

10. An acoustic signal encoding method that encodes an acoustic signal of a plurality of channels and/or a plurality of sound source objects and that is executed by an encoding device, comprising the steps of:

calculating a masking threshold corresponding to a spatial masking effect of hearing;

determining an amount of information to be allocated to each of the plurality of channels and/or the plurality of sound source objects by the calculated masking threshold;

encoding the acoustic signal of the plurality of channels and/or the plurality of sound source objects by each of the allocated amounts of information, wherein the masking threshold is calculated corresponding to the spatial masking effect of hearing based on a spatial distance and/or direction between each of the plurality of channels and/or between each of the plurality of sound source objects, wherein the masking threshold is calculated corresponding to the spatial masking effect of hearing such that, for a channel and/or a sound source object behind a listener, a degree of mutual influence on the spatial distance and/or direction between each of the plurality of channels and/or between each of the plurality of sound source objects is changed, wherein the masking threshold is adjusted by following equation (1)

$$T=\beta\{\max(y1,\alpha y2)-1\}$$

$$y1=f(x-\theta)$$

$$y2=f(180-x-\theta) \quad \text{equation (1)}$$

where T is a weight for multiplying to the masking threshold in the frequency domain of each channel signal in order to calculate the masking threshold, $\theta$ is direction of a masker, $\alpha$ and $\beta$ are scaling coefficients, and $0\leq\alpha\leq1$, $0\leq\beta$, and x indicates the direction or direction of a maskee.

11. The acoustic signal encoding method according to claim 10, wherein the masking threshold is calculated corresponding to the spatial masking effect of hearing such that degree of mutual influence of the signal of each of the plurality of channels and/or the plurality of sound source objects is changed according to whether the signal of each of the plurality of channels and/or the plurality of sound source objects is a tone-like signal or a noise-like signal.

12. The acoustic signal encoding method according to claim 11, wherein $\alpha$ is a constant controlled by the frequency of a masker, $\beta$ is a constant controlled according to whether a masker signal is a tone-like signal or a noise-like signal.

13. An acoustic signal decoding method performed by a decoding device, comprising the step of:

decoding the acoustic signal of the plurality of channels encoded by the acoustic signal encoding method according to claim 12.

14. An acoustic signal decoding method performed by a decoding device, comprising the step of:

decoding the acoustic signal of the plurality of channels encoded by the acoustic signal encoding method according to claim 11.

15. An acoustic signal decoding method performed by a decoding device, comprising the step of:

decoding the acoustic signal of the plurality of channels encoded by the acoustic signal encoding method according to claim 10.

16. An acoustic system including a decoding device and an encoding device that encodes an acoustic signal of a plurality of channels and/or a plurality of sound source objects and position information of the plurality of channels and/or the plurality of sound source objects, the encoding device comprising:

a masking threshold calculation unit that calculates a masking threshold corresponding to a spatial masking effect of hearing;

an information amount determination unit that determines an amount of information to be allocated to each of the plurality of channels and/or the plurality of sound source objects based on the masking threshold calculated by the masking threshold calculation unit; and an encoding unit that encodes the acoustic signal of the plurality of the channels and/or the plurality of sound source objects and the position information of the plurality of channels and/or the plurality of sound source objects by each of the allocated amounts of information, wherein the decoding device comprises:

a direction calculation unit that calculates the direction to which a listener is facing, a transmission unit that transmits the direction calculated by the direction calculation unit to the encoding device, and a decoding unit that decodes the acoustic signal of the plurality of channels and/or the plurality of sound source objects encoded by the encoding device into an audio signal; and the masking threshold calculation unit of the encoding device calculates the masking threshold corresponding to the spatial masking effect of hearing based on a spatial distance and/or direction between each of the plurality of channels and/or between each of the plurality of sound source objects according to position and direction of the listener.

17. The acoustic system according to claim 16, wherein the decoding device further comprising:

a three-dimensional sound reproduction unit that converts the audio signal decoded by the decoding unit into a three-dimensional sound signal that reproduces the three-dimensional sound for the listener.

18. A decoding device comprising:

a signal acquisition unit that acquires a signal for which an amount of information to allocate to each channel of a plurality of channels and/or each sound source object of a plurality of sound source objects was determined by a masking threshold that corresponds to a spatial masking effect of hearing, and in which an acoustic signal of the plurality of channels and/or the plurality of sound source objects and position information of the plurality of channels and/or the plurality of sound source objects are encoded by each of the allocated amounts of information; and a decoding unit that decodes an encoded acoustic signal of the plurality of channels and/or the plurality of sound source objects into an audio signal from the signal acquired by the signal acquisition unit, wherein the masking threshold is calculated corresponding to the spatial masking effect of hearing based on a spatial distance and/or direction between each of the plurality of channels and/or between each of the plurality of sound source objects, wherein the masking threshold is calculated corresponding to the spatial masking effect of hearing such that, for each of the plurality of channels and/or each of the plurality of sound source objects located at front-back symmetrical position with respect to a listener, a degree of mutual influence on the spatial distance and/or direction between each of the plurality of channels and/or each of the plurality of sound source objects is changed, wherein the masking threshold is calculated corresponding to the spatial masking effect of hearing such that, for a channel and/or sound source object behind the listener, a second channel and/or second sound source object is considered to exist, wherein the second channel and/or second sound source object considered to exist is the same as the channel and/or the sound source object behind the listener except that the second channel and/or the second sound source object is considered to be in front of the listener corresponding to the front-back symmetrical position relative to the channel and/or the sound source object behind the listener.

19. The decoding device according to claim 18, further comprising:

a three-dimensional sound reproduction unit that converts the audio signal decoded by the decoding unit into a three-dimensional sound signal that reproduces three-dimensional sound for the listener.

20. A decoding device comprising:

a signal acquisition unit that acquires a signal for which an amount of information to allocate to each channel of a plurality of channels and/or each sound source object of a plurality of sound source objects was determined by a masking threshold that corresponds to a spatial masking effect of hearing, and in which an acoustic signal of the plurality of channels and/or the plurality of sound source objects and position information of the plurality of channels and/or the plurality of sound source objects are encoded by each of the allocated amounts of information; and a decoding unit that decodes an encoded acoustic signal of the plurality of channels and/or the plurality of sound source objects into an audio signal from the signal acquired by the signal acquisition unit, wherein a direction calculation unit that calculates direction to which a listener is facing, and a transmission unit that transmits the direction calculated by the direction calculation unit to the encoding device is further provided.

21. The decoding device according to claim 20, further comprising:

a three-dimensional sound reproduction unit that converts the audio signal decoded by the decoding unit into a three-dimensional sound signal that reproduces three-dimensional sound for the listener.

22. An acoustic signal encoding method that encodes a sound source object and position information of the sound source object and that is executed by an encoding device, comprising the steps of:

calculating a masking threshold corresponding to a spatial masking effect of hearing;

determining an amount of information to be allocated to the sound source object by the calculated masking threshold; and encoding the sound source object and the position information of the sound source object by the allocated amount of information, wherein the masking threshold is calculated corresponding to the spatial masking effect of hearing based on a spatial distance and/or direction between each of a plurality of channels and/or between each of a plurality of sound source objects, wherein the masking threshold is calculated corresponding to the spatial masking effect of hearing such that, for each of the plurality of channels and/or a each of the plurality of sound source objects located at front-back symmetrical position with respect to a listener, a degree of mutual influence on the spatial distance and/or direction between each of the plurality of channels and/or each of the plurality of sound source objects is changed the masking threshold is calculated corresponding to the spatial masking effect of hearing such that, for a channel and/or sound source object behind the listener, a second channel and/or second sound source object is considered to exist, wherein the second channel and/or second sound source object considered to exist is the same as the channel and/or the sound source object behind the listener except that the second channel and/or the second sound source object is considered to be in front of the listener corresponding to the front-back symmetrical position relative to the channel and/or the sound source object behind the listener.

23. The acoustic signal encoding method according to claim 22, wherein the masking threshold is calculated corresponding to the spatial masking effect of hearing such that a degree of mutual influence of the signal of each of the plurality of channels and/or the plurality of sound source objects is changed according to whether the signal of each of the plurality of channels and/or the plurality of sound source objects is a tone-like signal or a noise-like signal.

24. The acoustic signal encoding method according to claim 23, wherein the masking threshold is adjusted by following equation (1)

$$T=\beta\{\max(y1,\alpha y2)-1\}$$

$$y1=f(x-\theta)$$

$$y2=f(180-x-\theta) \quad \text{equation (1)}$$

where T is a weight for multiplying to the masking threshold in the frequency domain of each channel signal in order to calculate the masking threshold, θ is direction of the masker, α is a constant controlled by the frequency of the masker, β is a constant controlled according to whether the masker signal is a tone-like signal or a noise-like signal, and x indicates the direction or direction of the maskee.

25. An acoustic signal encoding method that encodes a sound source object and position information of the sound source object and that is executed by an encoding device, comprising the steps of:

calculating a masking threshold corresponding to a spatial masking effect of hearing;

determining an amount of information to be allocated to the sound source object by the calculated masking threshold; and encoding the sound source object and the position information of the sound source object by each of the allocated amounts of information, wherein the masking threshold is calculated corresponding to the spatial masking effect of hearing based on a spatial distance and/or direction between each of a plurality of channels and/or between each of a plurality of sound source objects, wherein the masking threshold is calculated corresponding to the spatial masking effect of hearing such that, for a channel and/or a sound source object behind a listener, degree of mutual influence on the spatial distance and/or direction between each of the plurality of channels and/or each of the plurality of the sound source objects is changed, wherein the masking threshold is adjusted by following equation (1)

$$T=\beta\{\max(y1,\alpha y2)-1\}$$

$$y1=f(x-\theta)$$

$$y2=f(180-x-\theta) \quad \text{equation (1)}$$

where T is a weight for multiplying to the masking threshold in the frequency domain of each channel signal in order to calculate the masking threshold, θ is direction of the masker, α and β are scaling coefficients, and 0≤α≤1, 0≤β, and x indicates the direction or direction of a maskee.

* * * * *